US006999825B2

(12) United States Patent
Inomata

(10) Patent No.: US 6,999,825 B2
(45) Date of Patent: Feb. 14, 2006

(54) LOCKER SYSTEM, LOCKER CONTROLLING METHOD, CONTROL CENTER, AND RECORDING MEDIUM

(75) Inventor: Yoshihiro Inomata, Tokyo (JP)

(73) Assignee: NEC Corporation, Tokyo (JP)

( * ) Notice: Subject to any disclaimer, the term of this patent is extended or adjusted under 35 U.S.C. 154(b) by 179 days.

(21) Appl. No.: 10/023,807

(22) Filed: Dec. 21, 2001

(65) Prior Publication Data

US 2002/0080030 A1 Jun. 27, 2002

(30) Foreign Application Priority Data

Dec. 21, 2000 (JP) .................................... 2000-389329
Feb. 1, 2001 (JP) .................................... 2001-025865
Feb. 20, 2001 (JP) .................................... 2001-043529
Mar. 8, 2001 (JP) .................................... 2001-065141

(51) Int. Cl.
*G06F 19/00* (2006.01)

(52) U.S. Cl. ........................ 700/90; 700/237; 340/5.73

(58) Field of Classification Search ................... 700/90, 700/213–215, 231–232, 237, 233; 705/26, 705/14; 340/5.73

See application file for complete search history.

(56) References Cited

U.S. PATENT DOCUMENTS 5,126,732 A * 6/1992 Mardon ..................... 340/5.33
5,212,644 A * 5/1993 Frisch ........................ 705/418

(Continued)

FOREIGN PATENT DOCUMENTS

JP 03-052094 A 3/1991
JP H05-113066 A 5/1993

(Continued)

OTHER PUBLICATIONS

Provisional U.S. Appl. No. 60/218,400.*
Provisional U.S. Appl. No. 60/215218.*
Shukan Ekonomisuto (Weekly Economist), Mainichi Shinbunsha, Sep. 26, 2000, pp. 78–79.
Hiroshima shopping district's "CtoB" takes the opposite of the mall model. Gekkan Solution IT, Ric Telecom Co., Jan. 1, 2001, vol. 13, No. 1, pp. 20–27.

*Primary Examiner*—Leo Picard
*Assistant Examiner*—Alexander Kosowski
(74) *Attorney, Agent, or Firm*—Sughrue Mion, PLLC

(57) ABSTRACT

A user access the control center by a user terminal, and send a request for searching an available locker box in a desired area. The control center has database storing data representing which locker box is available. The control center searches the database for the available locker box which matches the user's request. The control center transmits information of the available locker to the user terminal. As the user reserves the locker, the control center generates one time password (OTP). The control center sends the OTP to the locker controller, and a display unit of the locker displays the OTP. The user inputs the displayed OTP to the user terminal and sends it to the control center. If the OTP is successfully authenticated, the control center sends commands to unlock the locker, thus, the user can use the reserved locker box.

18 Claims, 23 Drawing Sheets

U.S. PATENT DOCUMENTS

| | | | | | |
|---|---|---|---|---|---|
| 5,223,829 | A | * | 6/1993 | Watabe | 340/5.73 |
| 5,233,343 | A | * | 8/1993 | Mazzoni | 340/5.33 |
| 5,299,862 | A | * | 4/1994 | Rankine | 312/329 |
| 5,475,378 | A | * | 12/1995 | Kaarsoo et al. | 340/5.6 |
| 5,774,053 | A | * | 6/1998 | Porter | 340/568.1 |
| 5,946,660 | A | * | 8/1999 | McCarty et al. | 705/5 |
| 6,010,064 | A | * | 1/2000 | Umeda et al. | 235/375 |
| 6,300,873 | B1 | * | 10/2001 | Kucharczyk et al. | 340/568.1 |
| 6,344,796 | B1 | * | 2/2002 | Ogilvie et al. | 340/568.1 |
| 6,480,758 | B1 | * | 11/2002 | Stevens | 700/244 |
| 2002/0035515 | A1 | * | 3/2002 | Moreno | 705/26 |
| 2002/0147525 | A1 | * | 10/2002 | Cayne et al. | 700/214 |

FOREIGN PATENT DOCUMENTS

| | | | |
|---|---|---|---|
| JP | 06-243344 | A | 9/1994 |
| JP | 7-11806 | B2 | 2/1995 |
| JP | 6-65231 | A | 3/1995 |
| JP | 8-120986 | A | 5/1996 |
| JP | 9-330458 | A | 12/1997 |
| JP | 10-162242 | A | 6/1998 |
| JP | H11-18916 | A | 1/1999 |
| JP | 11-101035 | A | 4/1999 |
| JP | H11-201617 | A | 7/1999 |
| JP | 3071655 | U | 6/2000 |
| JP | 2001-266019 | A | 9/2001 |
| JP | 2002-8130 | A | 1/2002 |
| JP | 2002-109442 | A | 4/2002 |
| JP | 2002-150424 | A | 5/2002 |
| JP | 2002-154661 | A | 5/2002 |
| KR | 1996-0034647 | A | 10/1996 |
| KR | 2000-0054802 | A | 9/2000 |

* cited by examiner

*LOCKER INFORMATION DATABASE 340*

| AREA | LOCKER NO. | BOX NO. | FEE/h | STATUS | | START TIME | OTP | USER ID | ADDITIONAL INFO. |
|---|---|---|---|---|---|---|---|---|---|
| | | | | RES. | OCCU. | | | | |
| TOKYO 001 | A001 | 01 | $1.99- | YES | NO | --- | ******** | ABC001 | map001_a001.gif |
| | | 02 | | --- | YES | NOV.26 20:50 | ******** | EFG002 | |
| | | ⋮ | ⋮ | ⋮ | ⋮ | ⋮ | ⋮ | ⋮ | |
| | | 24 | $2.50- | NO | NO | --- | --- | --- | |
| | ⋮ | ⋮ | ⋮ | ⋮ | ⋮ | ⋮ | ⋮ | ⋮ | ⋮ |
| | Z999 | 01 | $1.85- | --- | YES | NOV. 26 14:15 | ******** | XYZ999 | map001_z999.gif |
| | | 02 | | NO | NO | --- | --- | --- | |
| | | ⋮ | | ⋮ | ⋮ | ⋮ | ⋮ | ⋮ | |
| | | 15 | | NO | NO | --- | --- | --- | |
| ⋮ | ⋮ | ⋮ | ⋮ | ⋮ | ⋮ | ⋮ | ⋮ | ⋮ | ⋮ |

*FIG. 5*

*USER INFORMATION DATABASE 350*

| USER ID | LOGIN PASSWORD | USER ATTRIBUTE DATA | PAYMENT |
|---|---|---|---|
| ABC001 | ******** | Yoshihiro INOMATA<br>***, Minato-ku, Tokyo<br>03-****-1234<br>⋮ | CREDIT CARD |
| ⋮ | ⋮ | ⋮ | ⋮ |

FIG. 6

LOCKER SYSTEM, LOCKER CONTROLLING METHOD, CONTROL CENTER, AND RECORDING MEDIUM

BACKGROUND OF THE INVENTION

1. Field of the Invention

The present invention relates to a locker system, a locker controlling method, a control center, and a recording medium, for remotely controlling lockers.

2. Description of the Related Art

A coin-operated locker has been known as a public-use locker which keeps baggage for a while. Such the conventional coin-operated locker employs a manually operated lock system which is operated by a user after coin insertion.

The user must bring some coins when using the locker, and the business managing the lockers has a troublesome task to collect the coins from every locker. The conventional coin-operated locker has such the inconvenient matters both for users and business, because it is coin-operated.

Moreover, users have no ways to know which locker is available beforehand. Therefore, they sometimes must walk around to looking for available locker if the nearest lockers are fully used.

Because of the manually operated lock system, the user must bring the key with him/her while leaving the baggage in the locker. The user must pay attention to handling the key to avoid compensation for missing. Furthermore, since one key is paired with one locker compartment, it is not compatible with sharing the compartment among some users.

Since the coin-operated lockers are in public use, they may be useful as advertisement media. For example, dropping handbills into vacant lockers may be one method of advertisement using the lockers. However, since users of the lockers are unknown, this method is not suitable for personalized advertisement.

The coin-operated locker may be applicable to a delivery support system. For example, a recipient informs a deliverer of his/her desired locker, and the deliverer drops the goods in the locker and locks it. The recipient goes to the locker to retrieve the goods whenever he/she likes. It is useful for cases where the recipient goes out, wishes to receive the goods at his/her desired place such as a place near office, and the like. However, the key must be passed to the recipient from the deliverer, therefore, it is still troublesome.

To overcome such the problem, Examined Japanese Patent Application KOKOKU Publication No. H7-11806 discloses a system wherein a center controls lockers. In this system, ID cards are issued to users, and the center allows the user to retrieve the goods from the locker by unlocking the door only when authentication of the ID card and password is successful. Since the system requires registration of user information and issuance of the ID card, it brings troublesome tasks to the user data management section, etc. Moreover, the locker requires mechanical structures such as a card reader and input keys. Therefore, establishment of the system costs much.

Moreover, the system is inappropriate for public use, because the locker is unavailable for unregistered persons who do not have the ID card.

SUMMARY OF THE INVENTION

The present invention has been made in consideration of the above problems. It is an object of the present invention to realize a secure locker system with easy handling.

It is another object of the present invention to realize an improved delivery support system with using the locker system.

It is still another object of the present invention to realize effective advertising with using the locker system.

To achieve the above objects, a locker system according to a first aspect of the present invention comprises lockers, a control center for remotely controlling the lockers, locker controllers applied to the lockers respectively, and user terminals operated by users of the lockers, the locker controllers, and the user terminals, wherein, each of the lockers include at least one compartment having an electronically controlled lock system and a display unit for displaying information given by the control center via a telecommunications network, the control center receives requests from the user terminals via the telecommunications network, and send instructions based on the received requests to the locker controllers via the telecommunications network, and the locker controller receives the instruction from the control center via the telecommunications network, and controls corresponding locker based on the received instruction.

In the above locker system, the control center may obtain status information of the lockers, specify available locker compartment which matches the user's request based on the status information, and provide information representing the available locker compartment to the user terminal which requested the control center to inform an available locker compartment.

In the locker system, the locker controller may control the electronically controlled lock system of the compartment to lock or unlock the compartment indicated by the instruction from the control center.

In the above locker system, the control center may generate ID information in response to receiving the user's request, and transmit the generated ID information to the locker controller, the locker controller may receive the ID information from the control center, and control corresponding display unit to display the received ID information, the user terminal may transmit the ID information input by the user to the control center, and the control center may receive the ID information from the user terminal, and transmits an instruction to allow the user to use the locker compartment to the locker controller, if the received ID information is correct.

In the above locker system, the control center may transmit an instruction to the locker controllers so as to keep unused locker compartments being locked.

The above locker system may further comprise a delivery center and deliverer terminals connected to the telecommunication network, wherein the control center may obtain information regarding to the delivery from the delivery center, store in a storage unit information sets each regarding to the delivery, the locker compartments, and the users so that the information sets are associated to each other, specify a locker compartment based on the information stored in the storage unit, transmit information representing the specified locker compartment to the deliverer terminal, and allow the deliverer to use the specified compartment by sending an instruction to unlock the compartment to the locker controller.

The above locker system may further comprise an advertisement information provider being connected to the telecommunications network, which provides advertisement information to be displayed on the display unit with the locker controller, wherein the advertisement information provider may obtain information regarding to a user of the locker compartment, the advertisement information provider may select advertisement information based on the information regarding to the user, and transmit the selected advertisement information to the locker controller when the user uses the locker compartment.

The above locker system may further comprising a billing server connected to the telecommunications network, which bills for service fees regarding to the locker.

According to the above locker system, a user can previously obtain information representing location of an available locker box (compartment) in his/her desired area, and reserve it with using a user terminal such as a cellular phone. It is helpful for the users because they are released from walking around to find available locker. And the users are charged for fees for the locker by the billing server, they can use the locker without possessing any coins.

According to the above locker system, the deliverer and the recipient can share the locker. It is helpful for establishing more convenient delivery support system.

Moreover, in a case where advertisement function is given to the lockers, it is able to provide personalized advertisement while the user is using the locker. It improves efficiency of the advertisement.

To achieve the above objects, a locker controlling method according to a second aspect of the present invention is a method for remotely controls lockers via a telecommunications network, comprises the steps of:

obtaining information representing the status of the lockers via the telecommunications network;

receiving user's request via the telecommunication network;

specifying an available locker compartment in the locker which matches the user's request based on the obtained status information;

informing the user of the specified locker via the telecommunications network;

informing the specified locker of ID information via the telecommunications network together with an instruction to present the ID information to the user;

receiving the ID information from the user via the telecommunications network; and providing a locker with an instruction to unlock the specified locker compartment via the telecommunications network, if the received ID information is correct.

In the above method, the instruction providing step may provide the locker with an instruction to keep the locker compartments being locked during the locker compartments are unused.

The above method may further comprises the steps of:

obtaining advertisement information to be presented at the lockers;

obtaining information regarding to a user via the telecommunications network;

selecting advertisement information based on the obtained information regarding to the user; and providing the locker with the selected advertisement information via the telecommunications network together with an instruction to present the provided advertisement information when the user uses the locker compartment.

The above method may further comprises the steps of:

obtaining information regarding to delivery from a deliverer via the telecommunications network;

specifying an available locker compartment in the locker based on the obtained delivery information;

informing the deliverer of the information representing the specified locker compartment via the telecommunications network; and informing the specified locker of ID information via the telecommunications network together with an instruction to present the ID information to the deliverer, wherein the ID information receiving step receives the ID information from the deliverer via the telecommunications network, and the instruction providing step provides the locker with an instruction to unlock the specified locker compartment via the telecommunications network, if the received ID information is correct.

The above method may further comprises the steps of:

recognizing a plurality of users as a group; and allowing the plurality of the users of the group to share the specified locker compartment.

The above method may further comprises the steps of:

obtaining information representing fees for the services of the lockers user by user; and billing the user for the service based on the obtained fee information.

To achieve the above objects, a control center according to a third aspect of the present invention is a control center for remotely controlling lockers via a telecommunications network, comprises:

a connector which connects the control center to the telecommunications network;

a status manager which controls the connector to obtain status information of the lockers;

a request receiver which controls the connector to receive user's request from user's terminals being connected to the telecommunications network;

a locker finder which specifies an available locker compartment based on the status information, which matches the user's request received by the receiver;

an ID information generator which generates ID information in response to the specification by the locker finder;

an information presenter which controls the connector to present information representing the locker compartment specified by the locker finder to the user's terminal together with the ID information generated by the ID information generator;

an ID information transmitter which controls the connector to provide the specified locker compartment with the ID information together with an instruction to present the ID information to the user;

an ID information receiver which controls the connector to receive the ID information from the user's terminal;

an ID information authenticator which determines whether the ID information received by the ID information receiver coincides with the ID information generated by the ID information generator; and a locker controller which controls the connector to transmit an instruction to unlock the locker compartment if the ID information authenticator determines that the ID information sets coincide with each other.

The above control center may further comprises:

an advertisement manager which obtains advertisement information to be presented at the lockers;

a user information obtainer which obtains information regarding to the user; and an advertisement selector which selects advertisement information based on the user information obtained by the user information obtainer, wherein the locker controller controls the connector to transmit the advertisement information selected by the advertisement selector to the specified locker compartment together with an instruction to present the advertisement information to the user.

To achieve the above objects, a computer readable recording medium according to a fourth aspect of the present invention stores a program which causes a computer to:

establish a connection with a telecommunications network;

obtain information representing status of lockers being connected to the telecommunications network;

receive a request of a user of the locker from a user terminal via the telecommunications network;

specify an available locker compartment based on the user's request and the status information;

transmit information representing the specified locker compartment to the user terminal via the telecommunications network;

generate ID information in response to the specification of the locker compartment;

transmit the generated ID information to the specified locker compartment via the telecommunications network together with an instruction to present the ID information to the user;

receive the ID information from the user terminal via the telecommunications network;

determine whether the received ID information coincides with the generated ID information; and transmit an instruction to the specified locker via the telecommunications network to unlock the specified locker compartment if it is determined that the received ID information coincides with the generated ID information.

The program stored in the above computer readable recording medium, may further cause the computer to:

obtain advertisement information to be presented at the lockers;

obtain information regarding to the user;

select advertisement information based on the obtained user information; and transmit the selected advertisement information to the specified locker via the telecommunications network together with an instruction to present the advertisement information to the user.

BRIEF DESCRIPTION OF THE DRAWINGS

These objects and other objects and advantages of the present invention will become more apparent upon reading of the following detailed description and the accompanying drawings in which:

FIG. 5 is a diagram exemplifying the data stored in the locker information database shown in FIG. 4;

FIG. 6 is a diagram exemplifying the data stored in the user information database shown in FIG. 4;

DETAILED DESCRIPTION OF THE PREFERRED EMBODIMENTS

First Embodiment

An embodiment of the present invention will now be described with reference to accompanying drawings.

Figure 1:
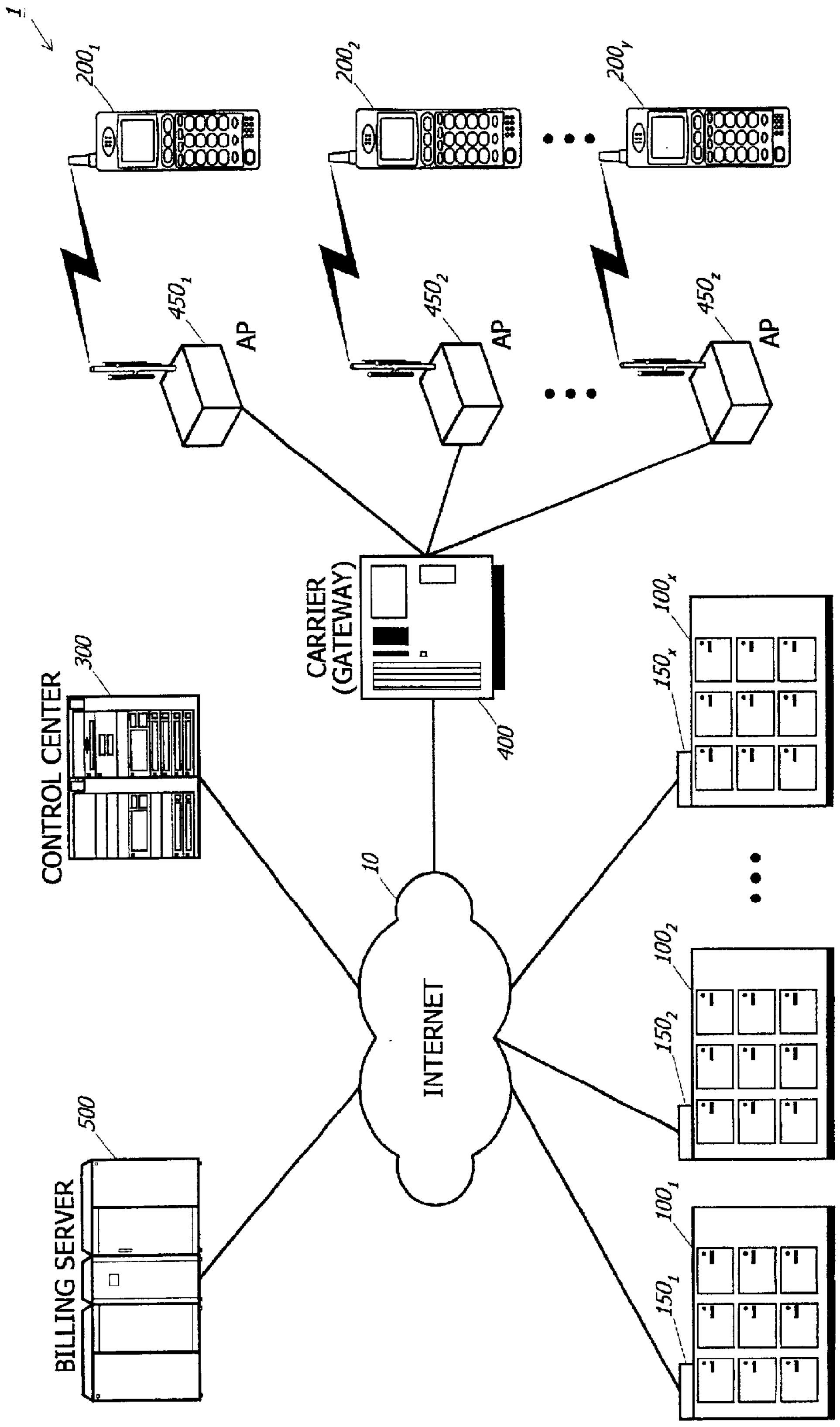
FIG. 1 is a diagram showing the structure of the locker system according to the first embodiment of the present invention.

FIG. 1 is a diagram schematically showing a locker system according to a first embodiment. As shown in FIG. 1, the locker system 1 comprises a telecommunications network (Internet) 10, a plurality of locker units $\mathbf{100}_1$ to $\mathbf{100}_x$ to which locker controllers $\mathbf{150}_1$–$\mathbf{150}_x$ are applied respectively, a plurality of user terminals $\mathbf{200}_1$–$\mathbf{200}_y$, a control center 300, a gateway (carrier) 400 being connected to access points (AP) $\mathbf{450}_1$–$\mathbf{450}_z$, and a billing server 500.

The telecommunication network 10 interconnects the locker controllers 150, the control center 300, the gateway 400, and the billing server 500. The telecommunications network 10 may be the Internet which is based on predetermined communication protocols such as TCP/IP (Transmission Control Protocol/Internet Protocol). In these embodiments, the Internet will be employed as the telecommunications network 10 (hereinafter, referred to as "Internet 10").

The locker units 100 are dispersed and managed by the control center 300. Each of the locker units 100 has at least one compartment with a door (hereinafter, referred to as "locker box"). The detailed structure of the locker unit 100 will now be described with reference to FIG. 2.

Figure 2:
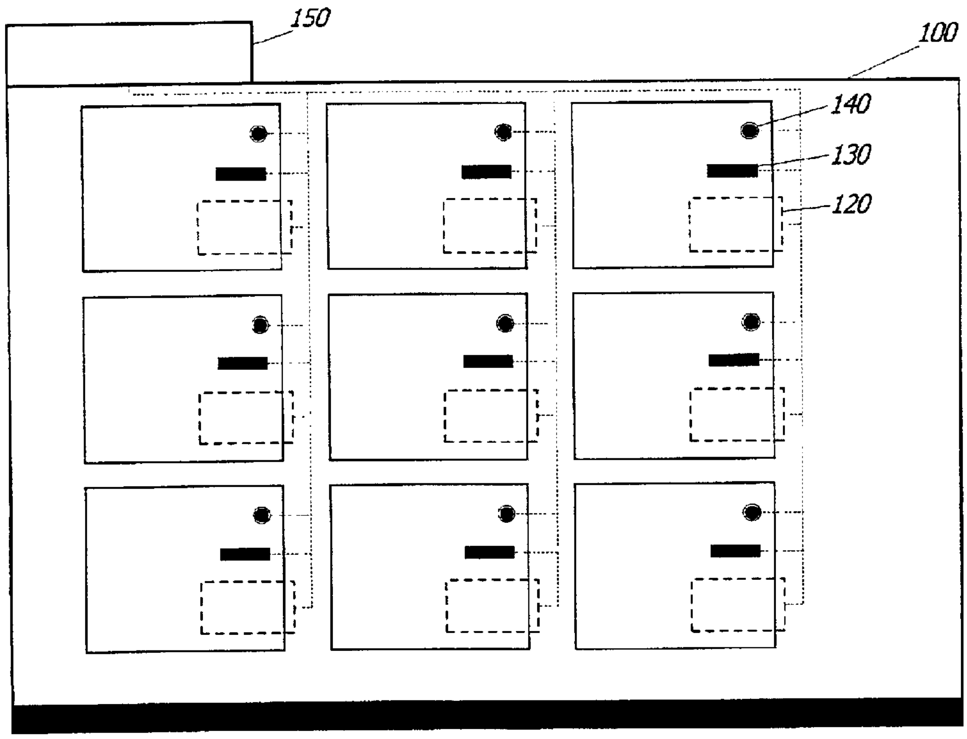
FIG. 2 is a diagram showing the locker according to the first to third embodiments of the present invention.

FIG. 2 is a diagram showing the structure of the locker unit 100. As shown in FIG. 2, the locker unit 100 has some locker boxes. Each of the locker boxes has an electronically controlled lock system (hereinafter, referred to simply as "EL") 120, a display unit 130, and a status indicator 140. The EL 120 has a mechanical lock structure to lock the door, which is controlled by electronic signals given by the locker controller 150. The display unit 130 may be an LCD (Liquid Crystal Display) or the like, to display at least ID information ("locker ID" given by the control center 300). The status indicator 140 may be an LED (Light Emission Diode) or the like, which indicates the status of the locker box.

The locker controller 150 controls the EL 120 respectively to lock or unlock the doors. The detailed structure of the locker controller 150 will now be described with reference to FIG. 3.

Figure 3:
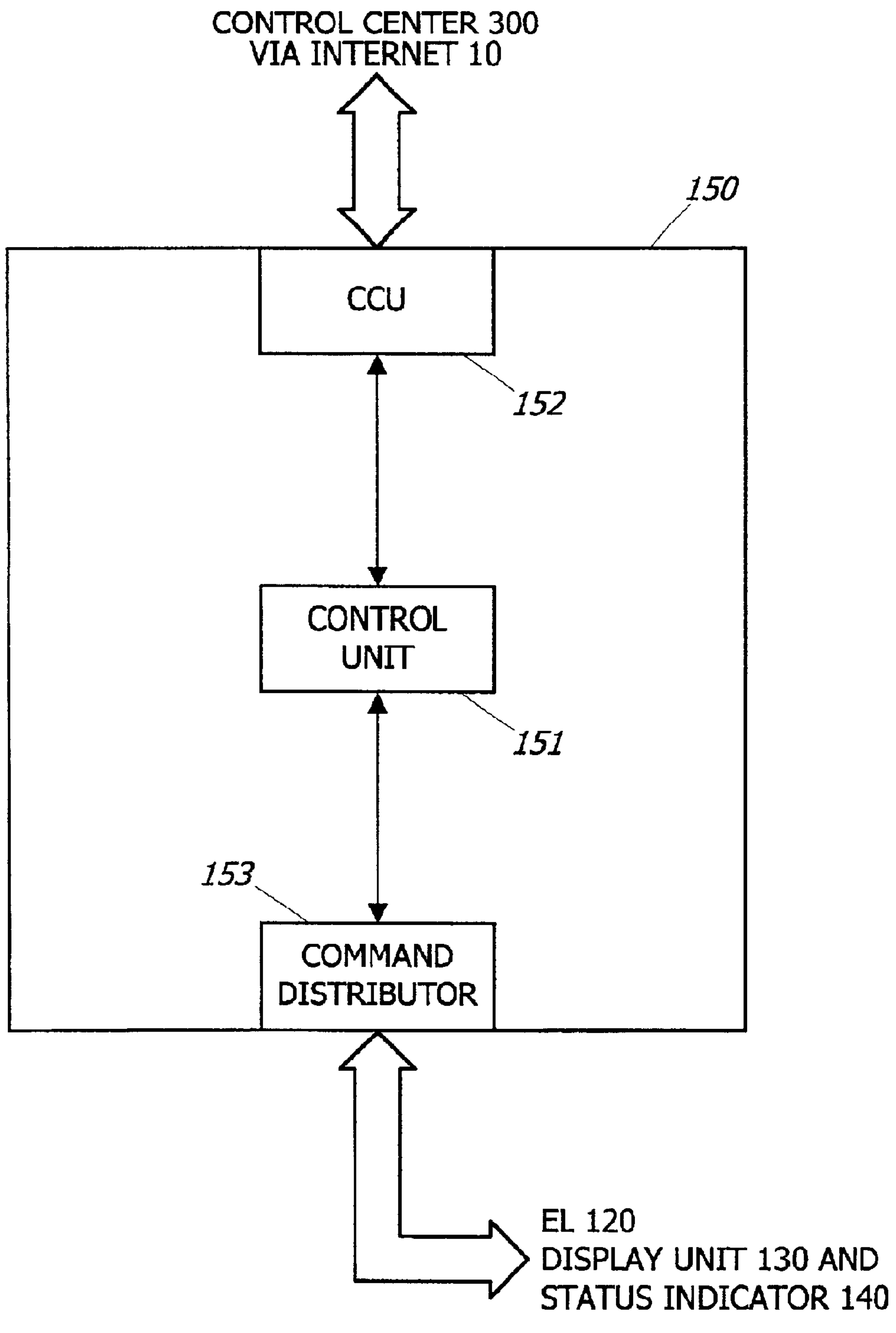
FIG. 3 is a block diagram schematically showing the structure of the locker controller shown in FIG. 1.

FIG. 3 is a block diagram showing the structure of the locker controller 150. As shown in FIG. 3, the locker controller 150 comprises a control unit 151, a CCU (Communications Control Unit) 152, and a command distributor 153.

The control unit 151 may be a CPU (Central Processing Unit) or the like, which controls the locker controller 150 in accordance with predetermined programs.

The CCU 152 may be a predetermined network interface card (NIC) or the like, which connects the locker controller 150 to the Internet 10, thus, receiving commands from the control center 300 and sending status information thereto. Arbitrary access line between the CCU 152 and the Internet 10 is applicable. That is, the CCU 152 may be connected to the Internet 10 via one or some of a leased line, PSTN (Public Switched Telephone Network), cellular phone network, cable television network, wireless communications network, and the like. Therefore, the CCU 152 is compatible with the employed access line, more precisely, with the communication protocol according to the employed access line.

The command distributor 153 distributes commands or information received by the CCU 152 from the control center 300 to appropriate EL 120, display unit 130 and status indicator 140 under control of the control unit 151. In accordance with the commands distributed by the command distributor 153, the EL 120 locks or unlocks the door, the display unit 130 displays information, and the status indicator 140 is activated or inactivated.

The user terminal 200 may be a portable terminal operated by a user of the locker unit 100. Arbitrary portable device may be employed as the user terminal 200, for example, cellular phone, PDA (Personal Data Assistant), notebook computer, and the like, which is compatible with web page browsing and e-mail communications via the Internet 10. Those should be compatible with the wireless communication system which allows them to access the Internet 10. More precisely, the user terminal 200 may access the Internet 10 via the gateway 400 (described later) which is compatible with the wireless communications.

The control center 300 may be a computer such as a main frame, and a workstation, which is operated by the business providing the locker units 100. The detailed structure of the control center 300 will now be described with referring to FIG. 4.

Figure 4:
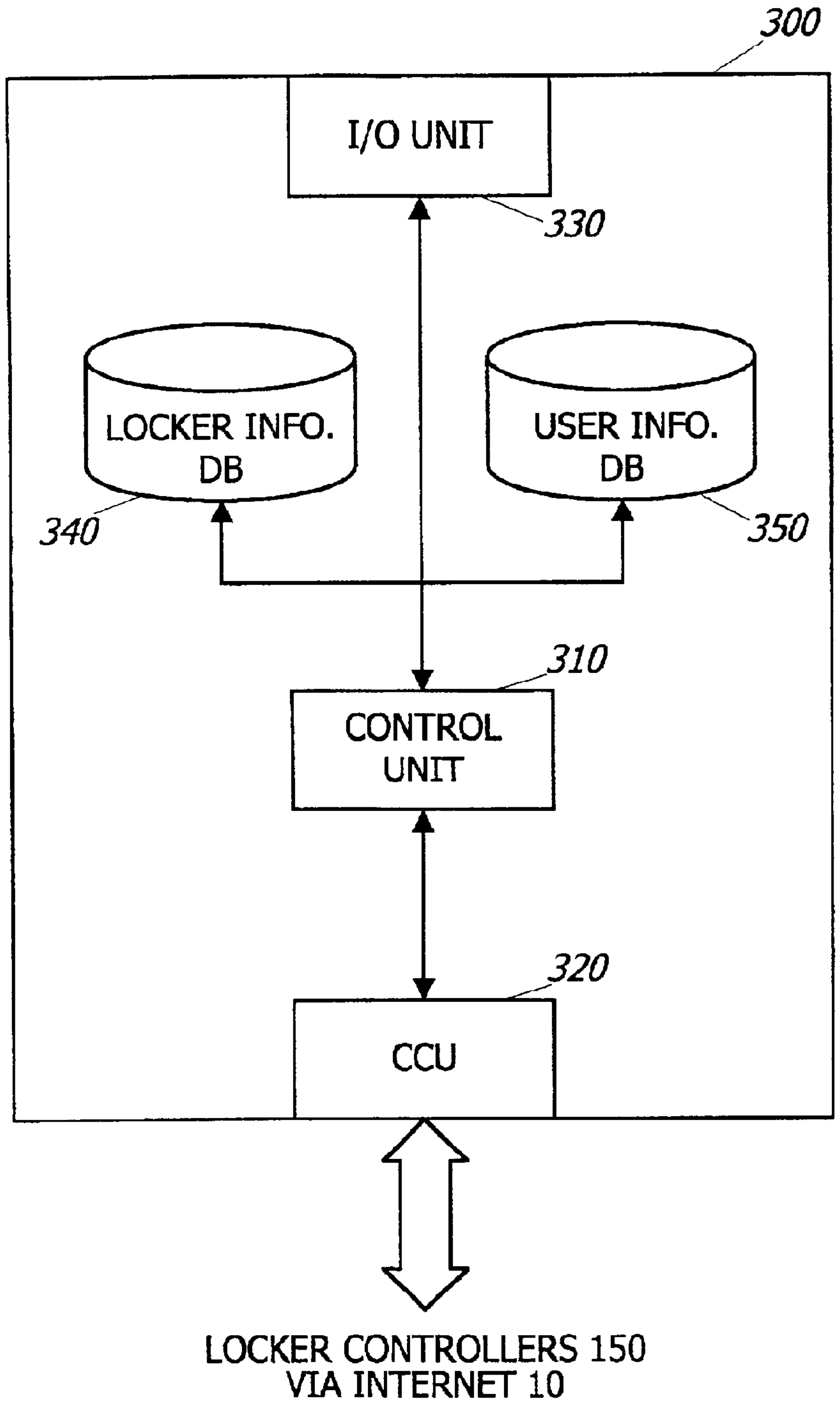
FIG. 4 is a block diagram schematically showing the structure of the control center shown in FIG. 1.

FIG. 4 is a block diagram schematically showing the structure of the control center 300. As shown in FIG. 4, the control center 300 comprises a control unit 310, a CCU (Communications Control Unit) 320, an I/O (input/output) unit 330, a locker information database 340 and a user information database 350.

The control unit 310 may be a CPU (Central Processing Unit) or the like, which executes predetermined programs to control the control center 300 and perform processing described later.

The CCU 320 may be a predetermined telecommunications device such as a router. The CCU 320 connects the control center 300 to the Internet 10 in accordance with predetermined communications protocol. The CCU 320 transmits commands or information to appropriate locker controllers 150, and receives status information of the locker units 100 from the locker controllers 150 and requests from the user terminals 200.

The I/O unit 330 may be a keyboard, a pointing device such as a mouse, a monitor, and the like to input data to be processed by the control center 300 and to output data processed by the control center 300.

The locker information database 340 may be a rewritable storage unit such as HDD (Hard Disk Drive) to store information regarding to the locker units 100. FIG. 5 shows an example of information stored in the locker information database 340. As shown in FIG. 5, the locker information database 340 stores information representing area, locker numbers according to areas, box numbers according to the lockers, fees according to boxes, status including reservation and occupation, start time representing date and time when occupation starts, one time password (hereinafter, referred to as "OTP": for example, random alphanumeric characters) generated each time, user ID of the user who occupies the locker box, additional information such as file name of map data, etc., and the like.

The user information database 350 may be a rewritable storage unit such as HDD (Hard Disk Drive) to store information regarding to users of the locker units 100. FIG. 6 is a diagram exemplifying information stored in the user information database 350. As shown in FIG. 6, the user information database 350 stores ID information for identifying the users, registered login password, user attribute data representing attributes of the users (such as name, address, phone number, and e-mail address), designated payment method, and the like.

The gateway 400 may be an arbitrary ISP which provides Internet access services to the public. In these embodiments, the users of the user terminals 200 contracted with the business of the gateway 400 for Internet access. The gateway 400 exchanges communications protocols, thus allowing various kinds of the user terminals 200 to access the Internet 10. In a case where the user terminal 200 is a cellular phone, the gateway 400 may be a cellular phone carrier. In these embodiments, cellular phones are employed as the user terminals 200, therefore, the cellular phone carrier will be employed as the gateway 400 (hereinafter, referred to simply as "carrier 400"). The carrier 400 comprises a plurality of access points (AP) 450 for providing the user terminals 200 with wireless access service.

The billing server 500 may be a server apparatus such as a main frame and a workstation which is accessible to the Internet 10, which manages billings for using the locker units 100 user by user. The billing server 500 may be operated by predetermined billing service business such as a credit card company. In these embodiments, the billing server 500 is separated from the control center 300 and the carrier 400, however, the control center 300 or the carrier (gateway) 400 may comprise the billing server 500.

Processing tasks executed in the locker system 1 according to this embodiment will now be described with reference to the drawings.

Figure 7:
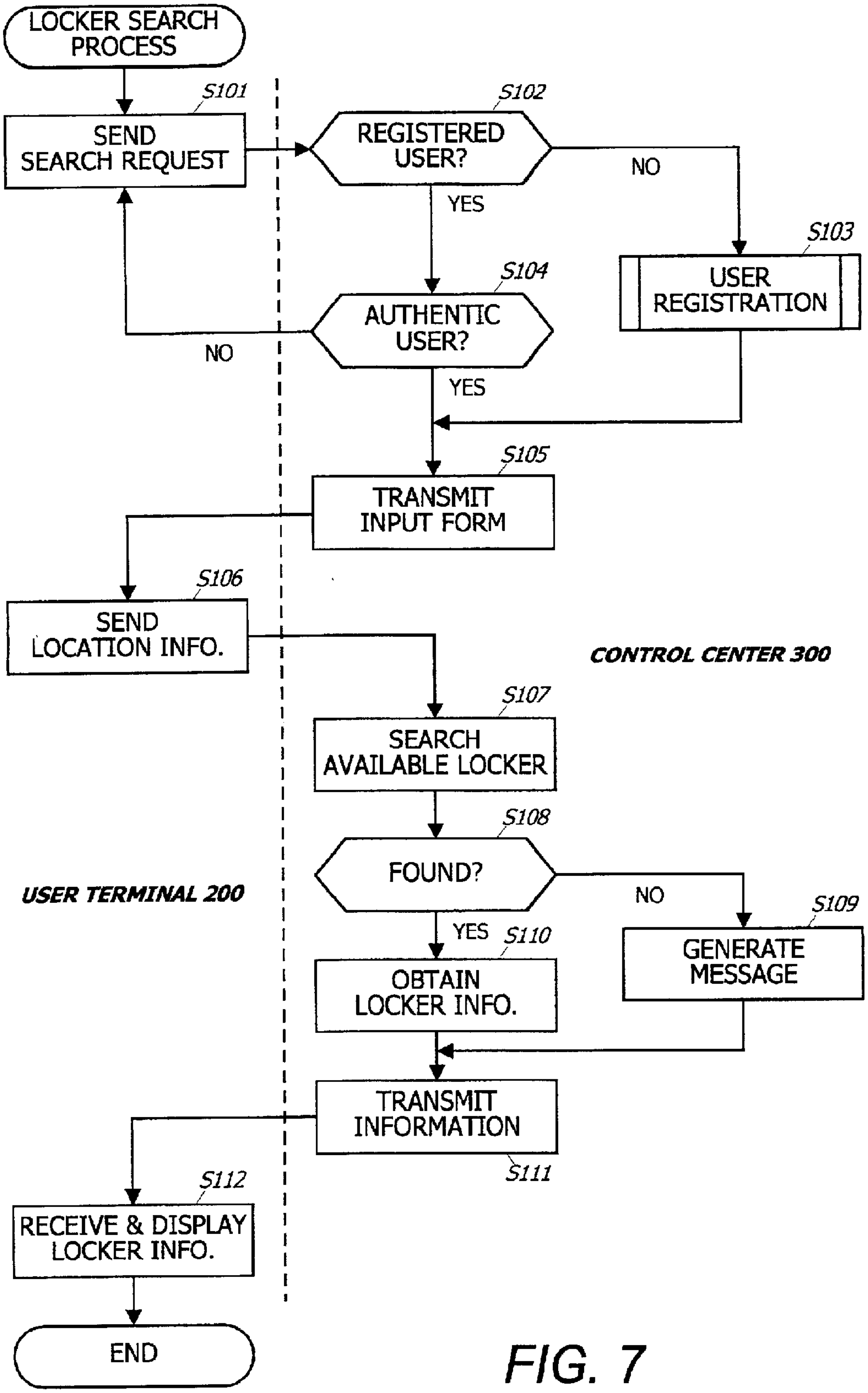
FIG. 7 is a flowchart for explaining the locker search process according to the first embodiment of the present invention.
Figure 8A:
FIG. 8A is a diagram exemplifying a menu page displayed on the user terminal.

FIG. 7 is a flowchart for explaining locker search process. A user who wants to use the locker unit 100 operates his/her user terminal 200 to access the control center 300. In response to the access, the control center 300 transmits data representing a menu page to the user terminal 200. The user terminal 200 receives page data and displays the menu page on its display unit as shown in FIG. 8A. The menu page has selectable items, for example, "Search Locker", "Unlock the Locker", "Re-Lock the locker", and "Terminate Service". The user operates the user terminal 200 to select desired item. If the user selects "Search Locker", the user terminal 200 transmits a search request to the control center 300 (step S101).

Figure 8B:
FIG. 8B is a diagram exemplifying another menu page displayed on the user terminal.

Upon reception of the search request, the control center 300 transmits another menu page as shown in FIG. 8B for confirming whether the user is the registered user or not.

If the user is an unregistered user, he/she may select "User Registration", and the user terminal 200 transmits a request for the user registration to the control center 300. Upon reception of the request (step S102: No), the control center 300 executes predetermined user registration process (step S103).

If the user is the registered user, the user terminal 200 transmits a request for service (Search Locker) in accordance with the user's operation. Upon reception of the request (step S102: Yes), the control center 300 transmits an input form page to input user ID and login password.

Figure 8C:
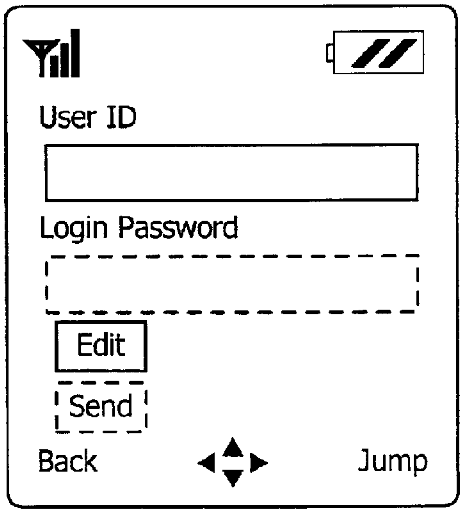
FIG. 8C is a diagram exemplifying an input form page displayed on the user terminal.

The user terminal 200 receives the input form page and displays it as shown in FIG. 8C. The user inputs his/her user ID and login password, and the user terminal 200 transmits the input data to the control center 300.

The control unit 310 of the control center 300 accesses the user information database 350 to determine whether the received user ID and login password have been registered or not.

If the user ID and login password are not found in the user information database 350 (step S104: No), the control center 300 may transmits the input form page (FIG. 8C) to the user terminal 200 for retrial.

If the control unit 310 determines the access user is the authenticated user (step S104: Yes), the control center 300 transmits another input form page to input location data to the user terminal 200 (step S105).

Figure 9A:
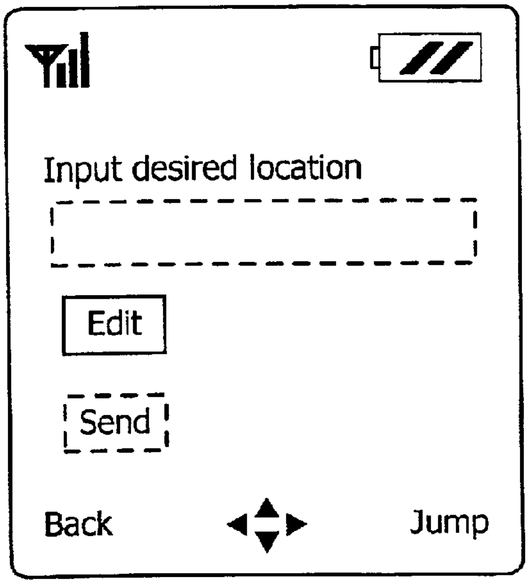
FIG. 9A is a diagram exemplifying another input form page displayed on the user terminal.

The user terminal 200 receives the input form page and displays it as shown in FIG. 9A. The user inputs desired location, and the user terminal 200 transmits the location data to the control center 300 (step S106).

Upon reception of the location data, the control unit 310 of the control center 300 accesses the locker information database 340 to search for available locker box corresponding to the area code which matches with the received location data (step S107).

As shown in FIG. 5, the locker information database 340 stores status information of the locker boxes. In FIG. 5, "RES." stands for "RESERVATION" and "OCCU." stands for "OCCUPATION". If "YES" is registered in "RESERVATION", that locker box is reserved. If "YES" is registered in "OCCUPATION", that locker is being occupied (used). Therefore, the control unit 310 searches for the locker box both of whose "RESERVATION" and "OCCUPATION" are "NO", because it represents that that locker box is now available.

Figure 9B:
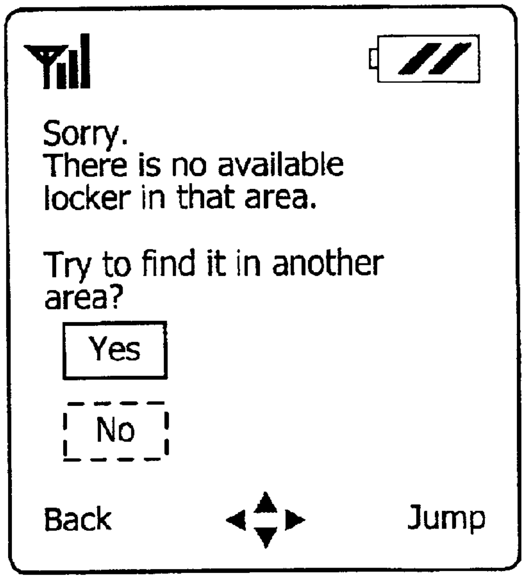
FIG. 9B is a diagram exemplifying a message page displayed on the user terminal.

If the control unit 310 determines that no lockers are available in the designated area (step S108: NO), the control unit 310 creates a message saying that no lockers are available (S109), and transmits it to the user terminal 200 (Step S111). The user terminal 200 receives the message and displays it as shown in FIG. 9B (step S111). The user terminal 200 receives the message and displays it as shown in FIG. 9B (step S112).

Figure 10A:
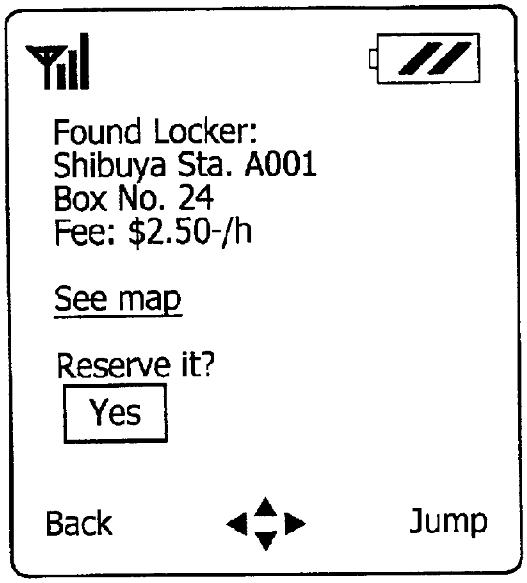
FIG. 10A is a diagram exemplifying a notice page displayed on the user terminal.
Figure 10B:
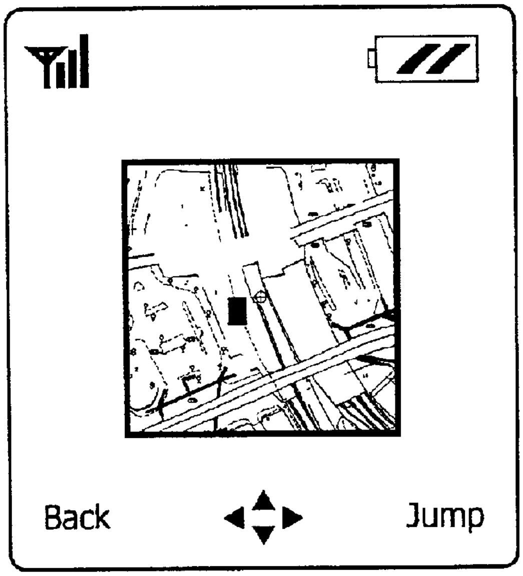
FIG. 10B is a diagram exemplifying a map page displayed on the user terminal.

If the control unit 310 finds an available locker box (hereinafter, referred to as "specified locker box") (step S108: YES), the control unit 310 obtains information regarding to that locker box (step S110). The control unit 310 controls the CCU 320 to transmit the obtained information of the specified locker box to the user terminal 200 (step S111). The user terminal 200 receives the data from the control center 300, and displays it on its display unit 130 as shown in FIG. 10A (step S112). As shown in FIG. 10A, the page has the description ("See map") linking to a map image showing the map around the specified locker. If the user selects the link, the user terminal 200 transmits a request for the map to the control center 300. In response to receiving the request, the control unit 310 obtains file name of the map image from the locker information database 340, and transmits the map image to the user terminal 200. The user terminal 200 receives the map data and displays it as shown in FIG. 10B. Then, the locker search process is terminated.

Figure 11:
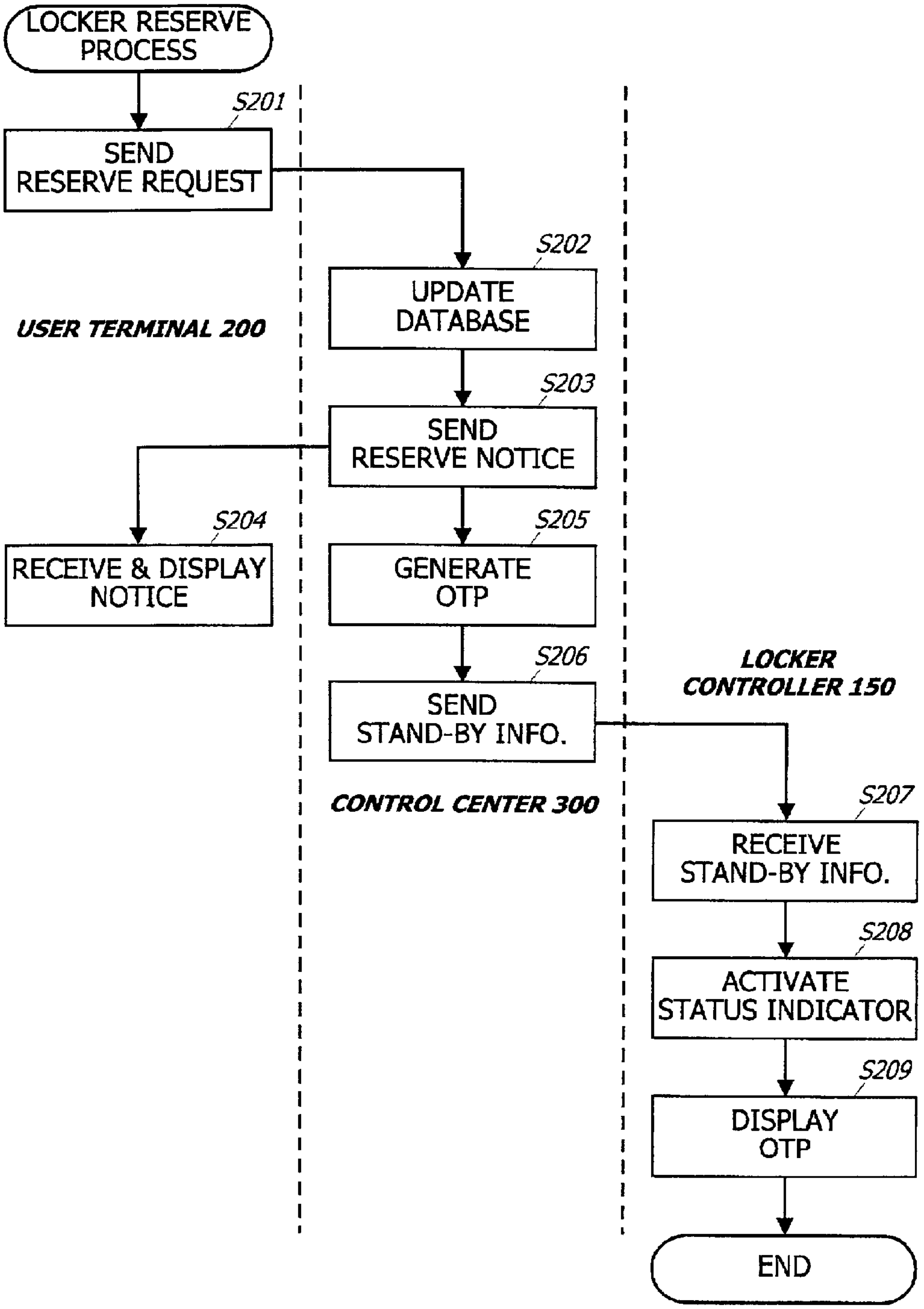
FIG. 11 is a flowchart for explaining the locker reserve process according to the first embodiment of the present invention.

Then, the locker reservation process will now be described with reference to drawings. FIG. 11 is a flowchart for explaining the locker reserve process.

As shown in FIG. 10A, the page indicates a message asking the user whether he/she reserves the specified locker box. If the user selects "YES", the user terminal 200 transmits a request for reservation to the control center 300 (step S201).

In response to the reception of the request for reservation, the control unit 310 accesses the locker information database 340 to update the status information (step S202). More precisely, the control unit 310 sets "YES" to the "RESERVATION" of the record for the locker box concerned. The control unit 310 also sets the user ID obtained at step S104 to the "USER ID" in the locker information database 340.

After the database update, the control unit 310 creates a message which notifying that the reservation has been done, and transmits it to the user terminal 200 (step S203) The user terminal 200 receives the notice, and displays it on its display unit (step S204).

The control unit 310 also generates OTP to be transmitted to the locker controller 150 corresponding to the specified locker box (step S205), and records it on the locker information database 340.

The control unit 310 controls the CCU 320 to transmit an instruction to the locker controller 150 corresponding to the specified locker box together with the generated OTP (hereinafter, referred to as "stand-by information") (step S206). In a case where the reservation has been done, the instruction to blink the status indicator 140 and to display the OTP on the display unit 130 are sent to the locker controller 150.

The CCU 152 of the locker controller 150 concerned receives the stand-by information from the control center 300 (step S207). In accordance with the instruction, the control unit 151 controls the command distributor 153 to send an instruction to the status indicator 140 of the specified locker box, to blink to indicate that that locker box is reserved (step S208). The control unit 151 also controls the command distributor 153 to send an instruction to the display unit 130 of the specified locker box to display the received OTP (step S209). And the locker reservation is terminated.

After the user arrives at the locker, the locker unlock process starts by the user's action with using the user terminal 200. The locker unlock process will now be described with reference to the drawings.

Figure 12:
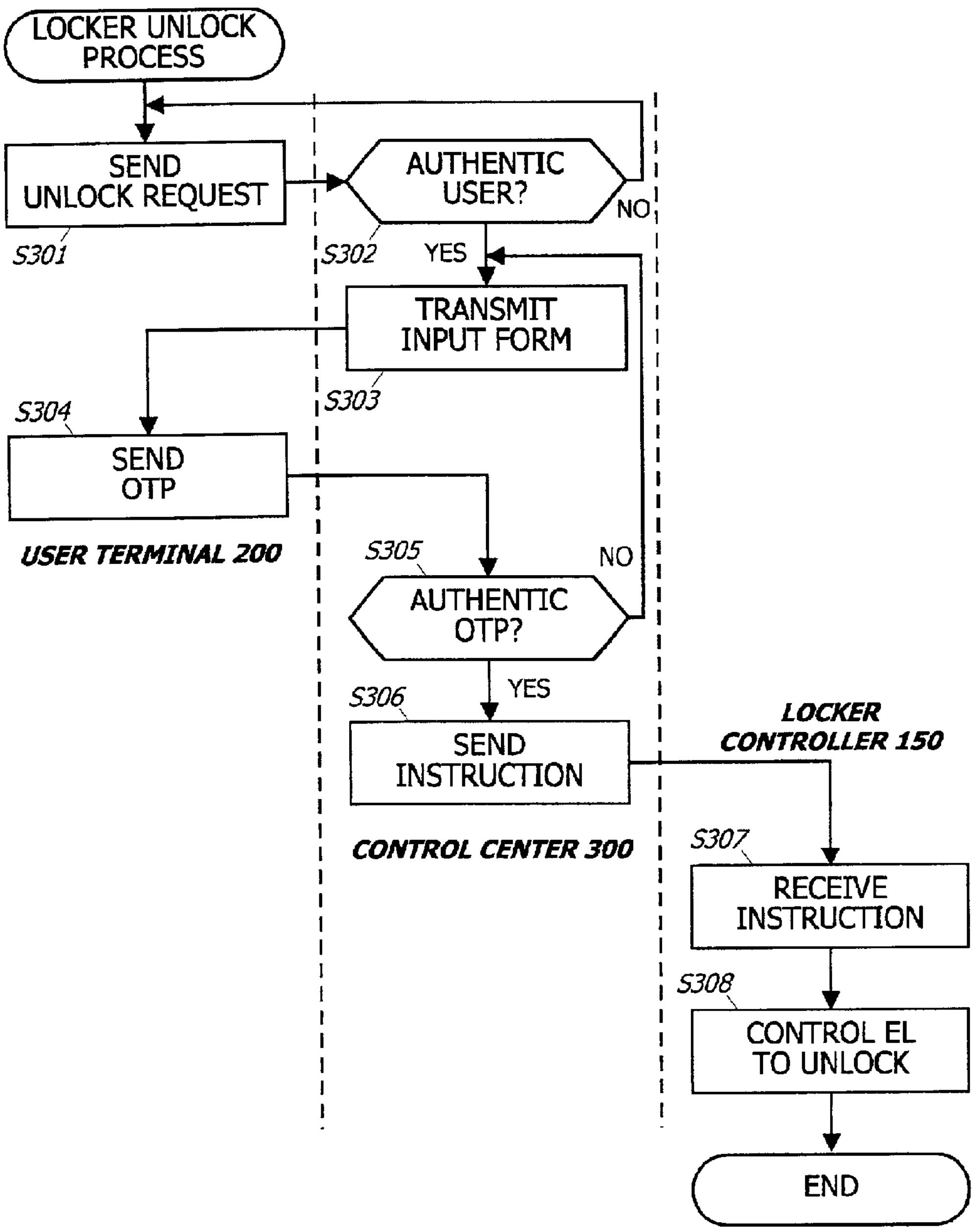
FIG. 12 is a flowchart for explaining the locker unlock process according to the first embodiment of the present invention.

FIG. 12 is a flowchart for explaining the locker unlock process. After the user arrives at the locker of the specified locker box, the user operates the user terminal 200 to access the control center 300, and transmits an unlock request by selecting the item "Unlock the Locker" in the menu page shown in FIG. 8A (step S301).

Upon receiving the unlock request, the control unit 310 executes user authentication in the same manner of step S104 by sending the input form page shown in FIG. 8C to the user terminal 200 concerned (step S302). If it is determined that the accessing user is the authenticated user (step S302: Yes), the control unit 310 controls the CCU 320 to transmit another input form page for inputting the OTP to the user terminal 200 (step S303).

The user terminal 200 receives the input form page, and displays it. The input form page has input fields to input the OTP. The user see the display unit 130 of the specified locker box, and inputs the displayed OTP through the input form page. The user further operates the user terminal 200 to transmit the input information (hereinafter, referred to as "locker ID") to the control center 300 (step S304).

In response to receiving the locker ID from the user terminal 200, the control unit 310 determines whether the received locker ID is correct or not by searching for the user ID and the OTP in the locker information database 340 (step S305).

If the control unit 310 determines that the received locker ID is not correct (step S305: No), the control unit 310 may, for example, transmit the input form page to the user terminal 200 again for retrial.

If the control unit 310 determines that the received locker ID is correct (step S305: Yes), the control unit 310 controls the CCU 320 to transmit an unlock instruction to the locker controller 150 corresponding to the specified locker box (step S306).

The CCU 152 of the locker controller 150 receives the unlock instruction from the control center 300 (step S307). In accordance with the unlock instruction, the control unit 151 controls the command distributor 153 to send an instruction to the EL 120 of the specified locker box to unlock the door (step 308), and the unlock process is terminated.

After the user drops his/her baggage in the locker, the locker re-lock process starts by the user's action with using the user terminal 200. The locker re-lock process will now be described with reference to the drawings.

Figure 13:
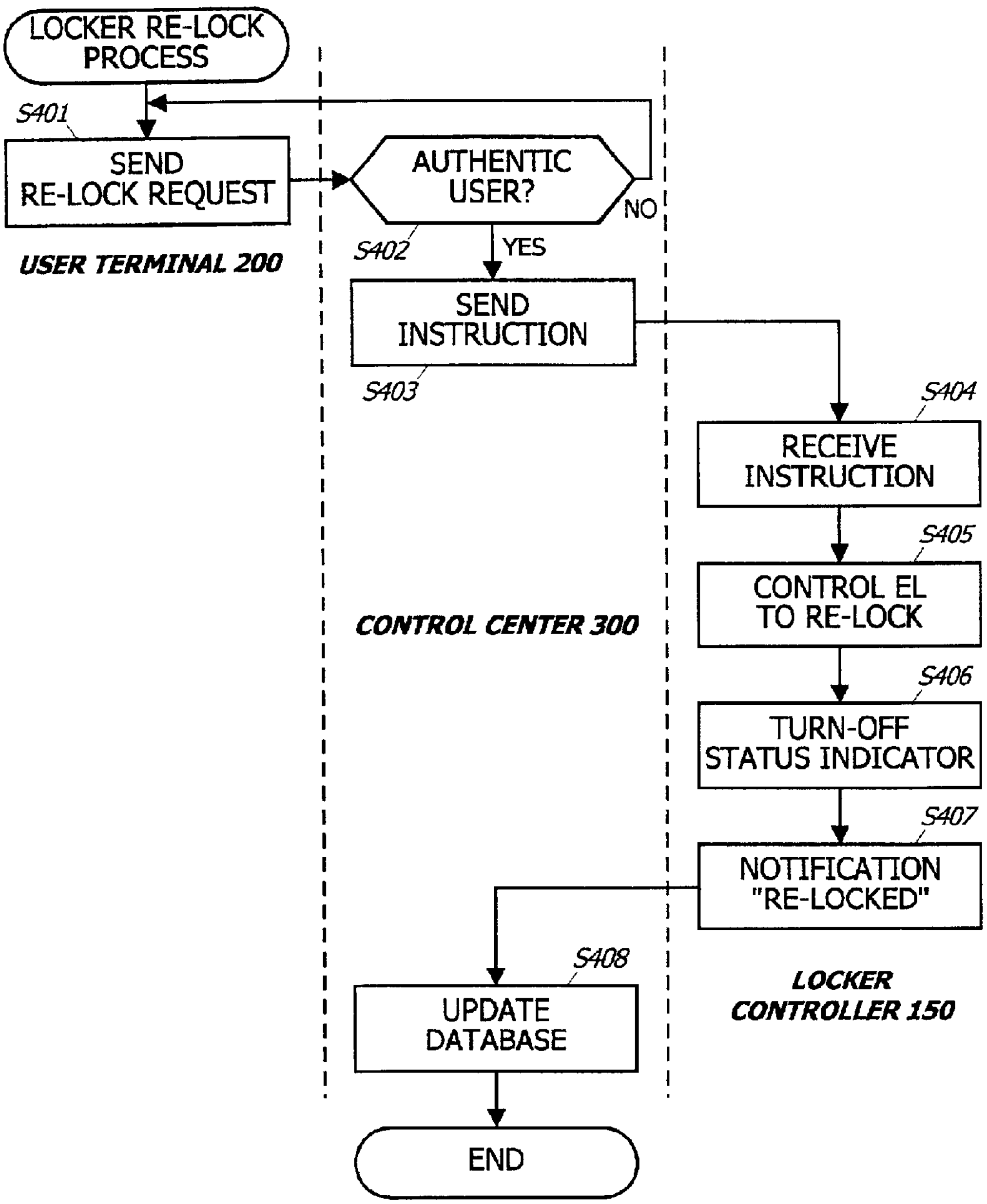
FIG. 13 is a flowchart for explaining the locker re-lock process according to the first embodiment of the present invention.

FIG. 13 is a flowchart for explaining the locker re-lock process. The user closes the door, and operates the user terminal 200 to send a re-lock request to the control center 300 by selecting the item "Re-Lock the Locker" from the menu page shown in FIG. 8A (step S401).

Upon receiving the re-lock request, control center 300 executes the user authentication in the same manner of the step S104 with checking the user ID and login password (step S402). If it is determined that the accessing user is the authenticated user (step S402: Yes), the control unit 310 controls the CCU 320 to transmit a re-lock instruction to the locker controller 150 (step S403).

The CCU 152 of the locker controller 150 receives the re-lock instruction from the control center 300 (step S404). In accordance with the re-lock instruction, the control unit 151 controls the command distributor 153 to send an instruction to the EL 120 of the specified locker box to re-lock the door (step S405). The control unit 151 also turns off the status indicator 130 to indicate that that locker box is being used (step S406).

In response to re-locking the door, the control unit 151 controls the CCU 152 to transmit a message to inform the control center 300 that the re-locking has been done (hereinafter, referred to as "re-lock notice) (step S407).

Upon reception of the re-lock notice, the control unit 310 of the control center 300 records the present date and time on the record of the specified locker box in the locker information database 340, and sets "YES" in "OCCUPATION" with deleting "YES" from "RESERVATION" (step S408).

Alternation of the unlock process and the re-lock process allows the user to drop the baggage in or retrieve it many times until he/she requests the service termination.

Figure 14:
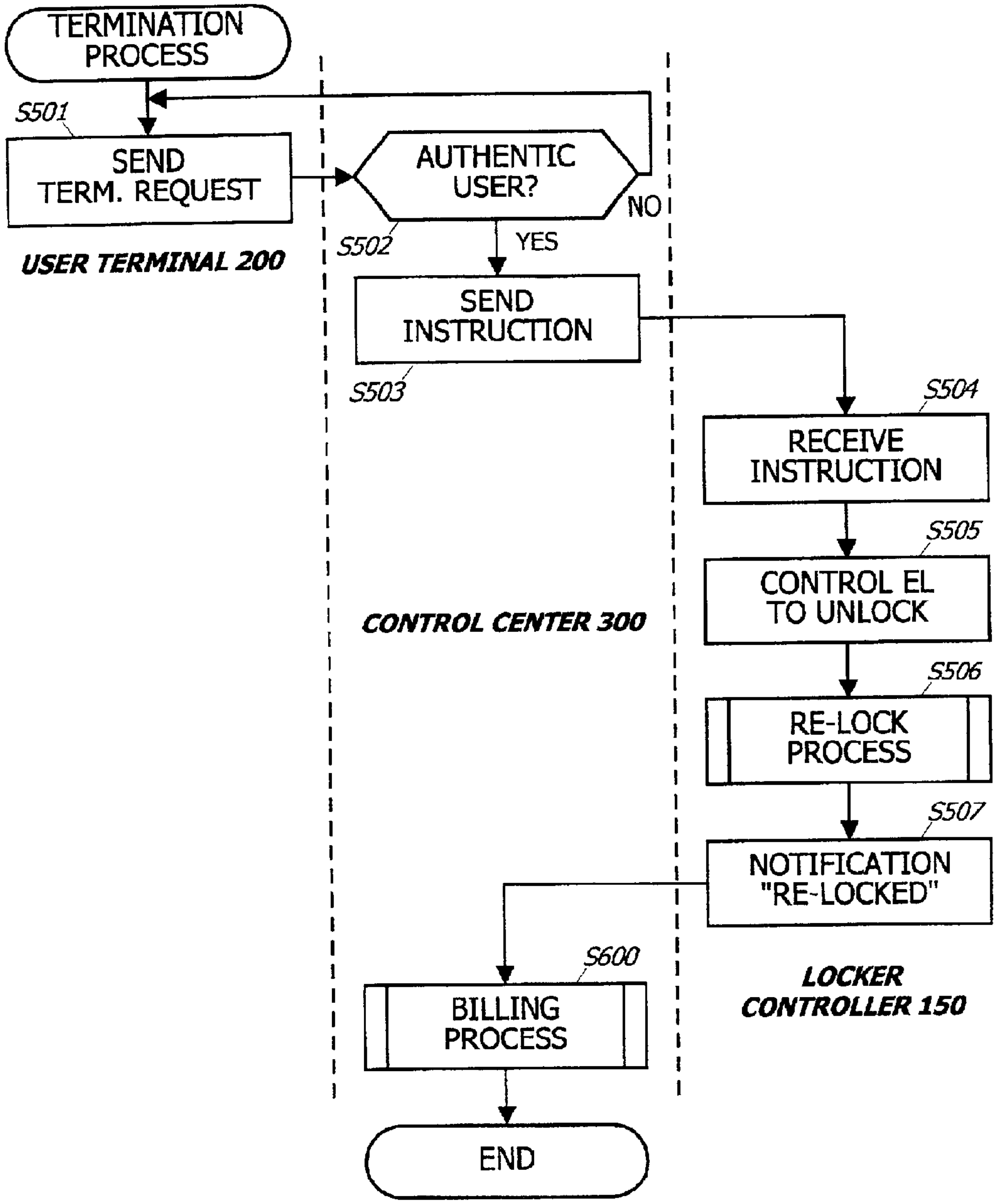
FIG. 14 is a flowchart for explaining the service termination process according to the first embodiment of the present invention.

The service termination process will now be described with reference to the drawings. FIG. 14 is a flowchart for explaining the service termination process.

After the user arrives at the locker box concerned, and operates the user terminal 200 to access the control center 300. The user further operates the user terminal 200 to select the item "Terminate Service" in the menu page shown in FIG. 8A, thus a request for the service termination (hereinafter, referred to as "termination request") is transmitted to the control center 300 (step S501).

Upon reception of the termination request, the control center 300 executes the user authentication in the same manner of the step S104 with checking the user ID and login password (step S502). If it is determined that the accessing user is the authenticated user (step S502: Yes), the control unit 310 controls the CCU 320 to transmit a termination request to the locker controller 150 corresponding to the locker box concerned (step S503).

The CCU 152 of the locker controller 150 receives the termination instruction from the control center 300 (step S504). In accordance with the termination instruction, the control unit 151 controls the command distributor 153 to send an unlock signal to the EL 120 corresponding to the locker box concerned, thus the door of the locker box is unlocked (step S505).

After the user retrieves the baggage from the locker box, he/she operates the user terminal 200 to execute the re-lock process of the steps S401–S407 (step S506).

After the locker box is re-locked, the EL 120 concerned informs the locker controller 150 that the re-locking has been done, and the locker controller 150 transmits the message saying the locker box concerned has been re-locked, to the control center 300 (step S507).

Figure 15:
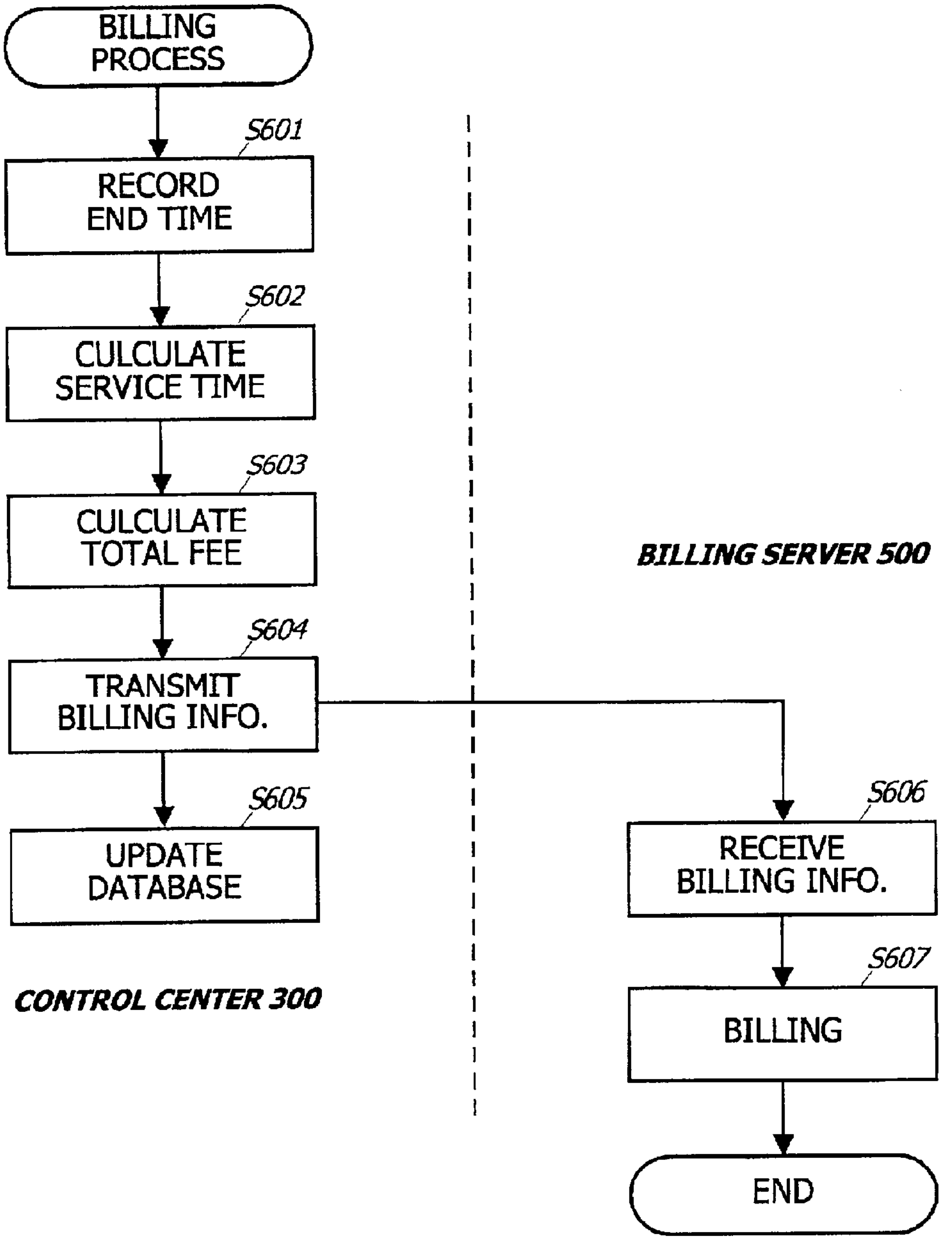
FIG. 15 is a flowchart for explaining the billing process according to the first embodiment of the present invention.

The CCU 320 receives the "re-locked" message from the locker controller 150. Upon reception of the message, the control unit 310 executes billing process (step S600). The billing process will now be described with reference to a flowchart shown in FIG. 15.

The control unit 310 records information representing the date and time when the CCU 320 receives the "re-locked" message as end time (step S601).

Then the control unit 310 accesses the locker information database 340, and obtains the information representing start time, from the record corresponding to the locker box concerned. And the control unit 310 calculates the service time based on the start time and the end time (step S602).

The control unit 310 further obtains the information representing fee per hour from the record, and calculates total fee based on the fee information and the calculated service time (step S603). The control unit 310 also accesses the user information database 350 to refer to the record of the user concerned, and obtains information representing the user attribution and payment method (hereinafter, referred to simply as "user information").

The control unit 310 controls the CCU 320 to transmit the user information and total fee information (hereinafter, those are referred to as "billing information") to the billing server 500 via the Internet 10.

After the transmission has been done, the control unit 310 access the locker information database 340 to update the data (step S605). More precisely, the control unit 310 sets "NO" in "RESERVATION" and "OCCUPATION" with deleting information representing start time and user ID.

The billing server 500 receives the billing information from the control center 300 (step S606), and performs predetermined billing service in accordance with the billing information (step S607). Then, the process is terminated.

According to the locker system 1 of the first embodiment, the user can search available locker box and reserve it with using the user terminal 200 such as the cellular phone. And, the user can unlock or re-lock the locker box any time he/she likes without inserting coins. Since the locker box is locked unless the user requests the control center 300 to unlock it, it is helpful for avoiding crimes using the locker box illegally. Moreover, since the information regarding to the users is registered in the control center 300, it also deterrents illegal use of the locker boxes.

Second Embodiment

The first embodiment raises an example of a service for a single user. The present invention also realizes a service for sharing one locker box among a plurality of users. An example of the locker sharing will now be described as a second embodiment. Structural feature of the second embodiment is basically the same as that of the first embodiment.

In this embodiment, a case where a user A drops the baggage in the locker box and another user B retrieves it will be explained.

The user A operates the user terminal 200 to search the available locker box and reserves the found available locker. Those processes are the same as the locker search process (FIG. 7) and the locker reserve process (FIG. 11) according to the first embodiment.

After the reservation has been done, the user A transmits an unlock request to the control center 300 as well as the first embodiment, thus the specified locker box is unlocked and the user A drops the baggage therein.

Figure 16:
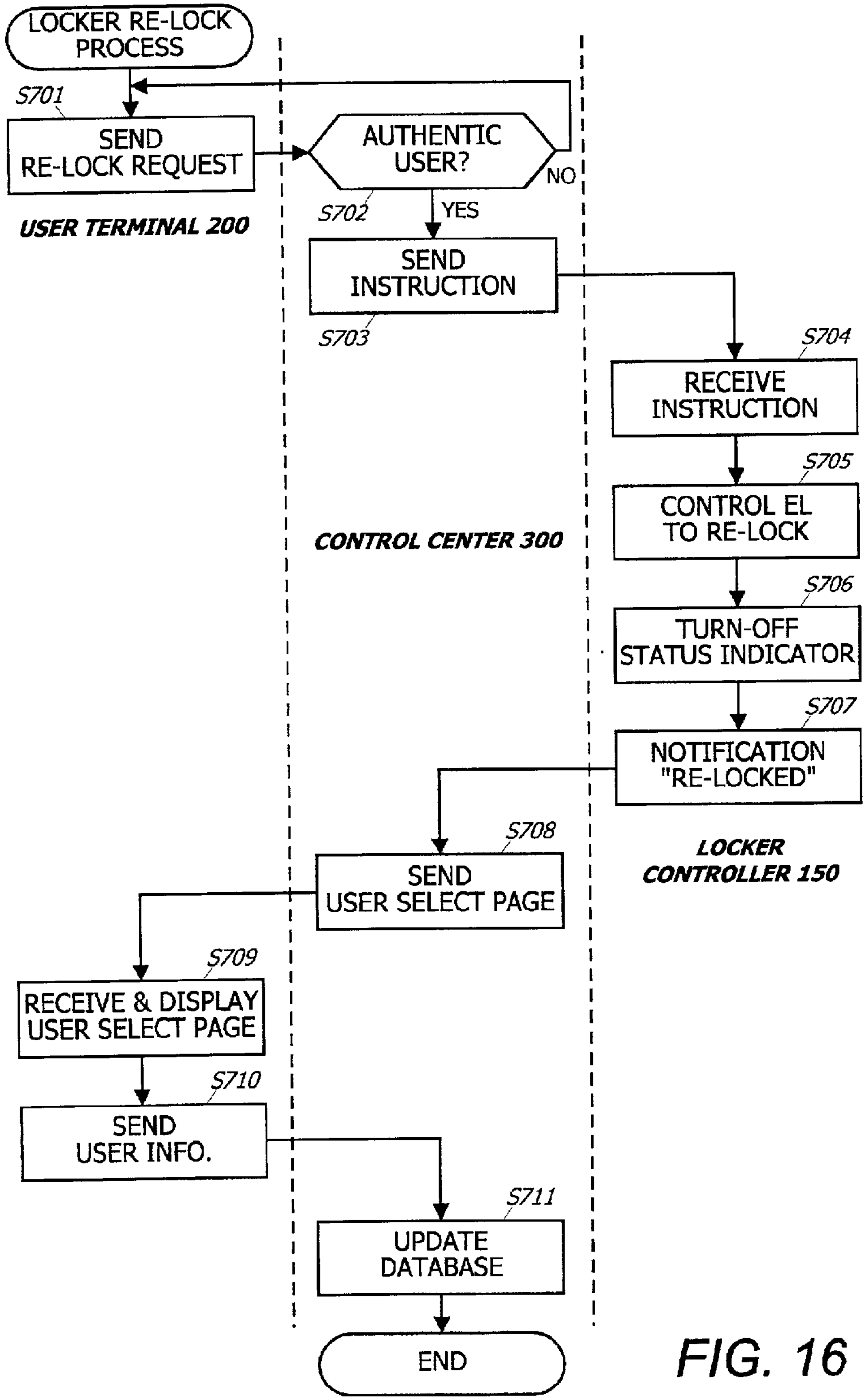
FIG. 16 is a flowchart for explaining the locker re-lock process according to the second embodiment of the present invention.

Then, the user A transmits a re-lock request to the control center 300 as well as the first embodiment, thus the locker re-lock process starts. The locker re-lock process according to the second embodiment will now be described with reference to a flowchart shown in FIG. 16.

In the same manner described in the first embodiment (steps S410–S407: FIG. 13), the specified locker box is re-locked, and the locker controller 150 transmits "re-locked" message to the control center 300 (steps S701–S707).

Upon reception of the "re-locked" message, the control unit 310 controls the CCU 320 to transmit a user select page to the user terminal 200 concerned (step S708).

Figure 17:
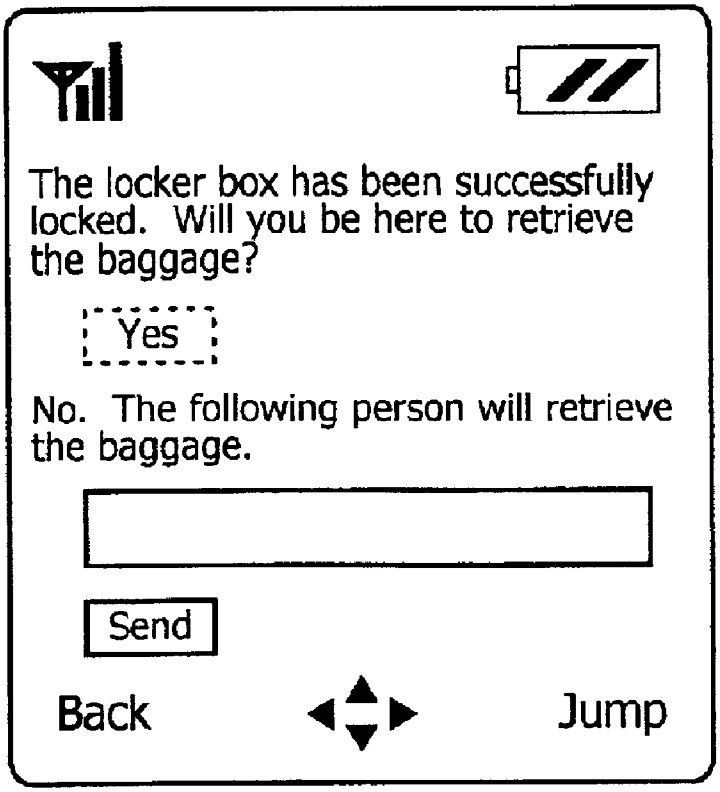
FIG. 17 is a diagram exemplifying a user select page displayed on the user terminal.

The user terminal 200 receives the user select page and displays it as shown in FIG. 17 (step S709). As shown in FIG. 17, the user select page says that the locker box has been re-locked, and asks the user A whether the user A will retrieve the baggage or not. The user select page has an input field for inputting user name of another user in a case where a user other than the user A will retrieve the baggage. In this case, the user A input user name (user B) who will retrieve the baggage, and transmits the input information (user information) to the control center 300 (step S710).

The CCU 320 of the control center 300 receives the user information. In response to the reception, the control unit 310 accesses the user information database 350 to obtain the user ID corresponding to the received user name. Then, the control unit 310 updates the locker information database 340 (step S711). More precisely, the control unit 310 sets the user ID information to "USER ID" in the record corresponding to the specified locker box, and the process is terminated.

Then, the user B operates his/her user terminal 200 to unlock the locker, re-lock the locker, or terminate the service, as well as the first embodiment. The billing process is also carried out. In this case, the recipient of the bill may be arbitrary. That is, one of the users A and B may be charged. Or, the billing server 500 charges so that the users A and B go fifty-fifty. Or, the user A may be charged for the fee for day 1, and the user B may be charged for the fee for day 2. Those variety of billing may be arbitrary selected under a contraction among the users and the billing business.

In this embodiment, the case where two users share the locker box has been explained. The present invention may be applicable to various cases. For example, the number of the users is arbitrary. Three or more users may share the locker box. In this case, all members may allowed to unlock or re-lock the locker box by recording user ID of all users in the locker information database 340.

Third Embodiment

The locker system according to the present invention may be applicable to the delivery service. An example where the locker system is applied to the delivery service will now be described as a third embodiment.

Figure 18:
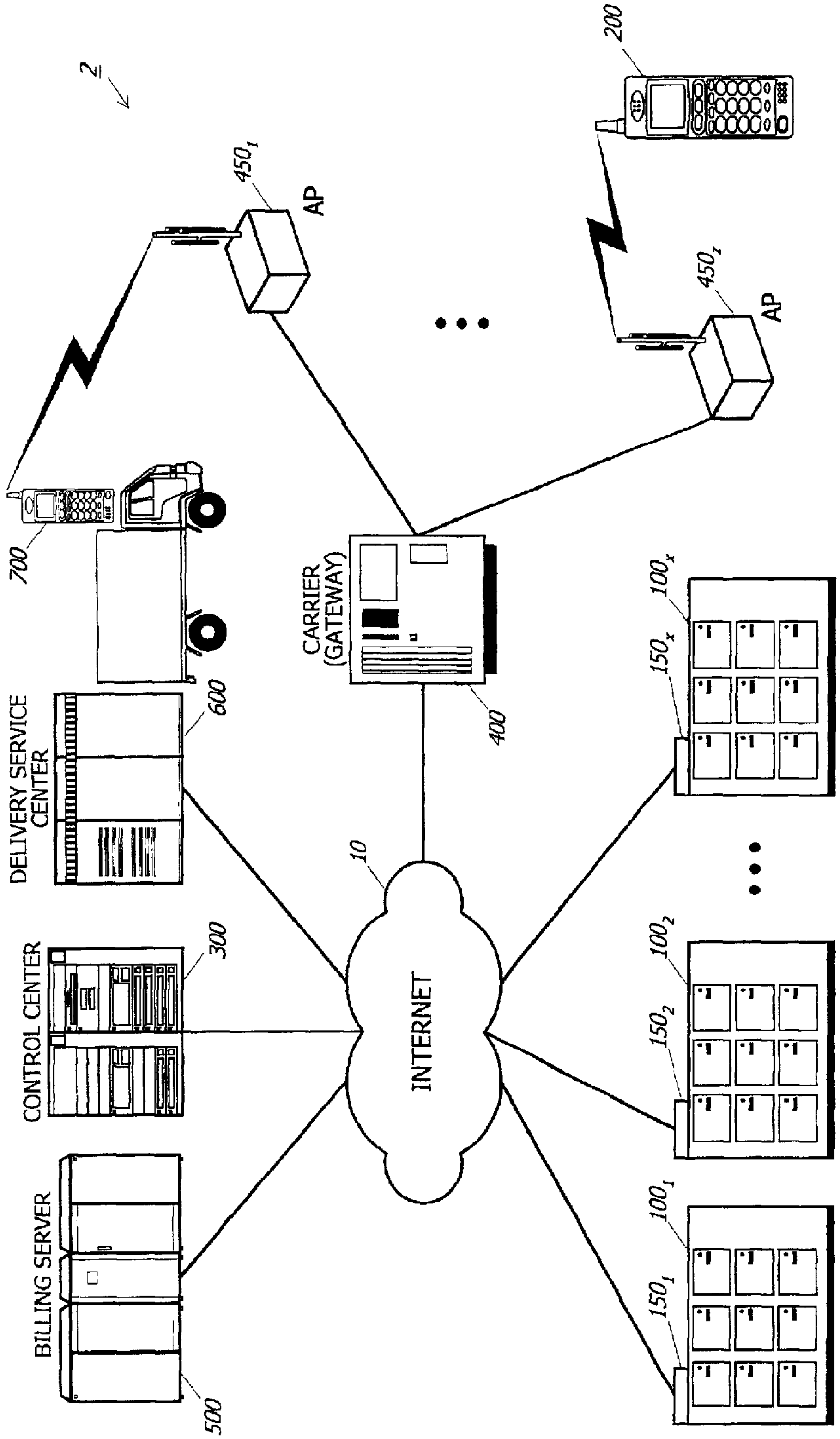
FIG. 18 is a diagram showing the structure of the locker system according to the third embodiment of the present invention.

FIG. 18 is a diagram showing the locker system 2 according to the third embodiment. Structural features of the locker system 2 are basically the same as those of the locker system 1 according to the first and second embodiments, therefore, the same reference symbols denote the same components. In addition to the structure of the locker system 1, the locker system 2 comprises a delivery service center 600 and deliverer terminals 700.

The delivery service center 600 may comprise a main frame, a workstation or the like which is accessible to the Internet 10. The delivery service center 600 may be operated by a delivery service business which has contracted with the locker management business to use the locker units 100 for the delivery service. In this embodiment, the delivery service business carries on the on-line shopping service. That is, the delivery service center 600 accepts shopping orders from the user terminals 200, and manages its delivery service. Moreover, the delivery service center 600 has a web server which provides the web site being accessible via the Internet 10. In this embodiment, the web site is a shopping site.

The deliverer terminal 700 is a mobile communication terminal such as a cellular phone, or the like, which is accessible to the Internet 10. In this embodiment, the cellular phone is employed as the deliverer terminal 700, therefore, the deliverer terminal 700 accesses the Internet 10 via the access point 450 nearby. For simplifying the explanation, the deliverer terminals 700 and the user terminals 200 are provided by the same cellular phone carrier in this embodiment, however, arbitrary carriers may provide the deliverer terminals 700 and the user terminals 200 respectively.

In this embodiment, the control center 300 comprises a deliverer information database 350 additionally. The deliverer information database 350 stores information regarding to deliverer (drivers or the like) of the delivery service business such as deliver ID, login password, and the like.

Process according to the third embodiment will now be described with reference to the drawings. In this embodiment, the user of the delivery service has been registered in the control center 300.

Figure 19:
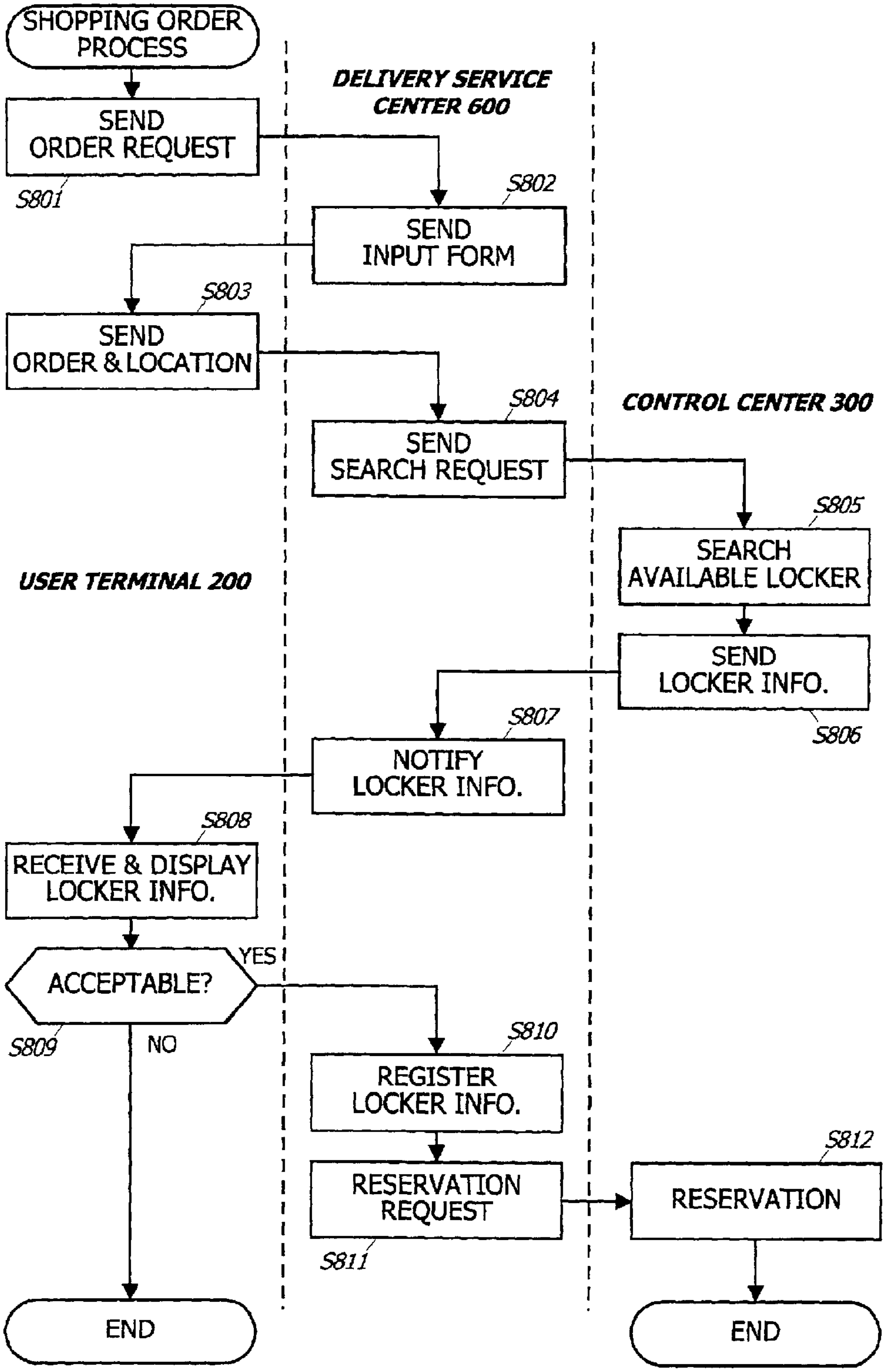
FIG. 19 is a flowchart for explaining the shopping order process according to the third embodiment of the present invention.

FIG. 19 is a flowchart for explaining the shopping order process.

A user operates his/her user terminal 200 to access the shopping web site provided by the delivery service center 600. That is, the user terminal 200 transmits a request for order to the delivery service center 600 (step S801).

Upon reception of the request, the delivery service center 600 transmits input form page to the user terminal 200 (step S802). The input form page has input fields for inputting the order information and desired location of the locker. The order information may be item No. or the like which designates goods, and the location data may designates area.

The user inputs the order information and the location data (hereinafter, referred to simply as "order information"), and operates the user terminal 200 to transmit the input order information to the delivery service center 600 (step S803).

Upon reception of the order information, the delivery service center 600 transmits a search request to the control center 300 (step S804). In this case, the search request includes the location (area) data.

The CCU 320 of the control center 300 receives the search request, and the control unit 310 accesses the locker information database 340 to search for available locker box based on the received area data (step S805).

Then, the control unit 310 controls the CCU 320 to transmit information of the found locker box (hereinafter, referred to as "specified locker box") to the delivery service center 600 (step S806). The information (hereinafter, referred to as "locker information") may represent address of the locker, locker No., locker box No., map data, and the like.

Upon reception of the locker information, the delivery service center 600 transfers the received locker information to the user terminal 200 concerned (step S807).

The user terminal 200 receives the locker information and displays it (step S808). If the specified locker is not acceptable for the user, the user operates the user terminal 200 to cancel the process (step S808: No). The user may select another delivery service, or the like.

If the specified locker is acceptable for the user (step S808: Yes), the user operates the user terminal 200 to notify the delivery service center 600 that the user accept the specified locker.

Upon reception of the notice, the delivery service center 600 generates a record for the user in a predetermined storage, registers the user information and the locker information in the record (step S809).

After the registration has been completed, the delivery service center 600 transmits a reservation request to the control center 300 (step S810). In this case, the delivery service center 600 informs the control center 300 of the deliverer ID and the user ID of the recipient (hereinafter, referred to as "recipient ID").

Upon reception of the reservation request, the control center 300 reserve the specified locker box in the same manner described in the first embodiment (steps S202, S205–S209: FIG. 11). In this case, the control center 300 registers the deliverer ID and the recipient ID in the record corresponding to the specified locker box. Then, the shopping order process is terminated.

Figure 20:
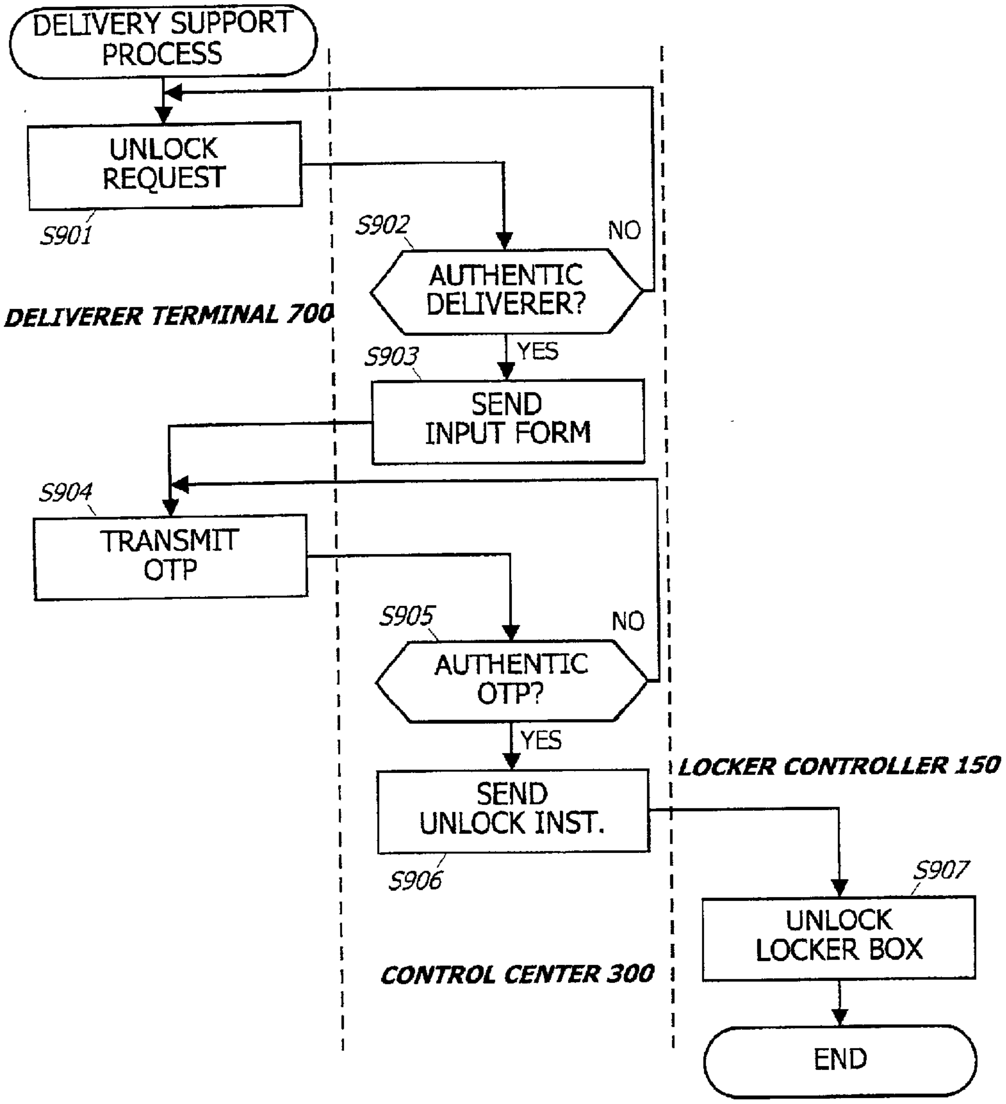
FIG. 20 is a flowchart for explaining the delivery support process according to the third embodiment of the present invention.

After the locker reservation has been done, the delivery service center 600 carries out delivery support process. The delivery management process will now be described with reference to a flowchart shown in FIG. 20.

The delivery section of the delivery service business arranges delivery based on the order. In this case, the destination is the locker unit 100 including the specified locker box (hereinafter, referred to as specified locker).

When a deliverer (a driver or the like) arrives the specified locker unit 100, he/she operates his/her deliverer terminal 700 to access the control center 300 with informing his/her deliverer ID and login password (step S901).

The CCU 320 of the control center 300 receives the deliverer ID and login password, and the control unit 310 accesses the deliverer information database 350 to authenticate the deliverer (step S902).

If the deliverer is authenticated (step S902), the control center 300 transmits an input form page to the deliverer terminal 700 (step S903).

The deliverer terminal 700 receives the input form page and displays it. The deliverer see the display unit 103 of the specified locker box, and inputs the displayed OTP through the input form page. And the user operates the deliverer terminal 700 to transmits the input data to the control center 300 (step S904).

Upon reception of the OTP from the deliverer terminal 700, the control unit 310 accesses the locker information database 340 to determined the received OTP is correct or not. If it is the authentic password (step S905: Yes), the control unit 310 controls the CCU 320 to transmit an unlock instruction to the locker controller 150 corresponding to the specified locker box (step S906).

The CCU 152 of the locker controller 150 concerned receives the unlock instruction, and the control unit 151 controls the command distributor 152 to control the EL 120 corresponding to the specified locker box to unlock the door (step S907).

Then, the delivery support process is terminated. The deliverer drops the goods in the unlocked locker box, and carries out re-lock process in the same manner described in the first embodiment (steps S401–S408: FIG. 13, in this case, tasks for the user terminal 200 are carried out by the deliverer terminal 700).

After the re-locking is done, the deliverer may operates the deliverer terminal 700 to inform the recipient's user terminal 200 that the delivery has been done.

Then, the recipient goes to the specified locker box, and operates his/her user terminal 200 to carry out the locker re-lock process and the service termination process in the same manner described in the first embodiment (steps S401–S408: FIG. 13, and steps S501–S509: FIG. 14), thus he/she retrieve the goods.

According to the third embodiment, the user (recipient) can designate desired locker when ordering the delivery service, thus the user can receive the goods whenever or wherever he/she likes. In this case, the recipient may further designate a term for keeping the goods in the locker box. In this case, the billing server 500 may charge the user for extra hours.

The deliverer terminal 700 may request a list for delivery assigned to the deliverer. In this case, the delivery service center 600 may provide the deliverer terminal 700 with pages in which areas and locker box numbers are linked to each other.

Usually, a package to be delivered may have an ID tag showing bar code information (UPC, EAN, JAN, and the like) which represents delivery information and the like. Such the bar code information may be associated with the requests or instructions used for the above locker system 2. In this case, the deliverer terminal 700 may have image reading device such as a camera, CCD (charge coupled device), or the like to read the bar code image on the ID tag. Then the deliverer terminal 700 may send requests for unlocking, re-locking or the like based on the read bar code information.

In the above described embodiment, the case where the deliverer delivers the goods. The present invention may be applicable to a case where the user uses the lockers to deliver goods to business which collects the goods, for example, laundry service or the like. In case of laundry service, the user unlock the locker by carrying out the above described locker unlock process with using the user terminal 200. The user drops the laundry in the locker, and re-lock the locker by carrying out the above described locker re-lock process. Then, the user informs the laundry service business of the locker box number, and the like. The service person of the laundry service business visits the designated locker box, and carries out the above described locker unlock process with using the deliverer terminal 700, and collects the laundry. The laundry service person, then deliver the laundry to the locker box, and the user receives it in the same manner described in this embodiment.

Fourth Embodiment

The lockers for the locker system according to the present invention may have advertisement media. A case where the advertisement service is applied to the locker system according to the present invention will now be described as a fourth embodiment.

Figure 21:
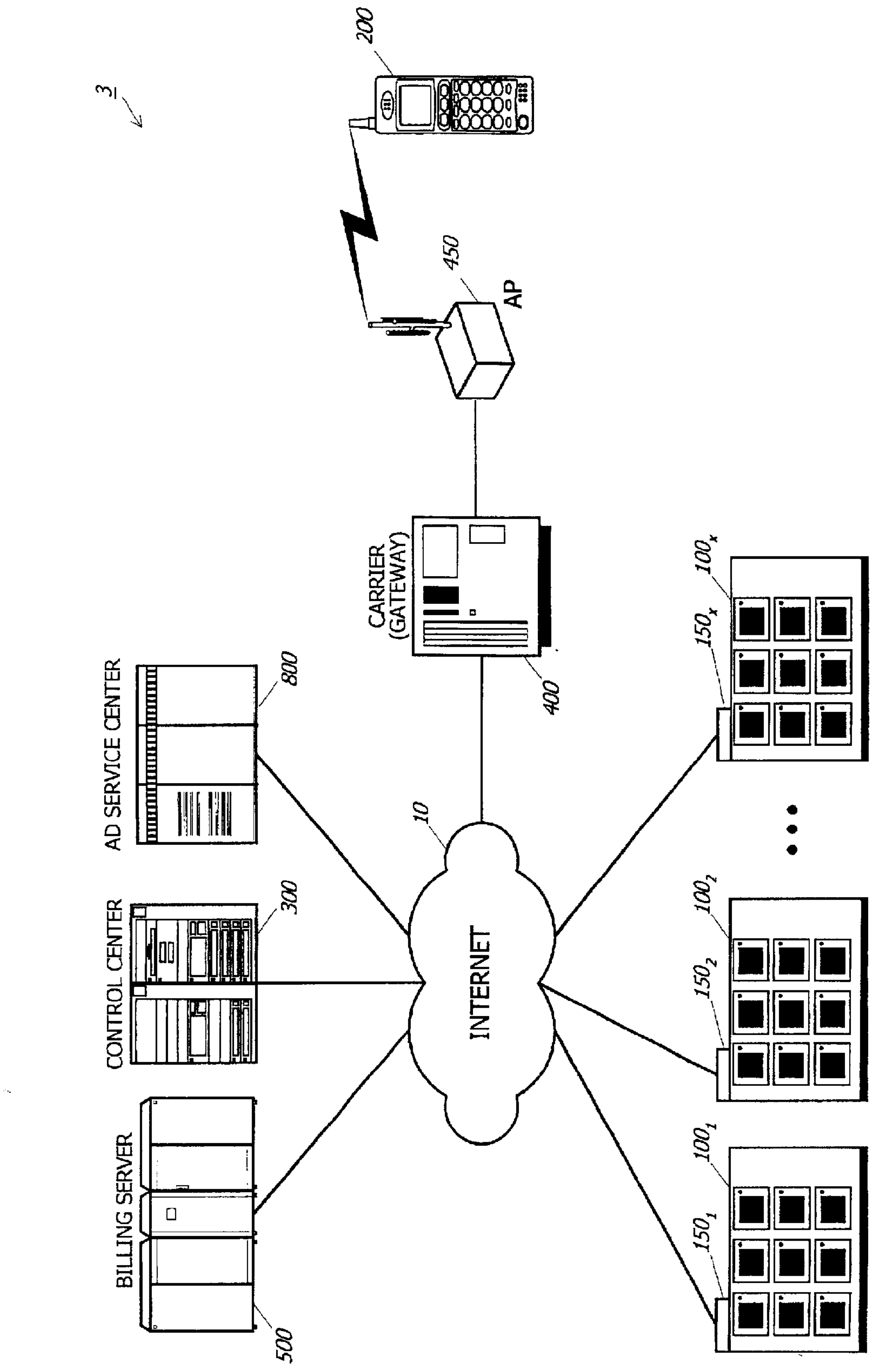
FIG. 21 is a diagram showing the structure of the locker system according to the fourth embodiment of the present invention.

FIG. 21 is a diagram showing the structure of the locker system 3 according to the fourth embodiment. As described in FIG. 21, the featured component of the fourth embodiment is an advertisement service center 800. Other components are basically the same as those of the locker system 1 shown in FIG. 1 according to the first embodiment, therefore, the same reference symbols denote the same components.

The advertisement service center (hereinafter, referred to simply as "ad center") 800 comprises a mainframe, a workstation, or the like which is accessible to the Internet 10. The ad center 800 stores various advertisement image data and provides them via the Internet 10. More precisely, the ad center 800 comprises an ad image database in which ad image data and their additional data are stored. The additional data may represent target consumers, and the like. In the ad image database, the ad image data may be categorized based on such the additional data. In this embodiment, the ad service business which runs the ad center 800 have contraction with the locker system business for using the display unit on the locker units 100 as the advertisement medium.

Figure 22:
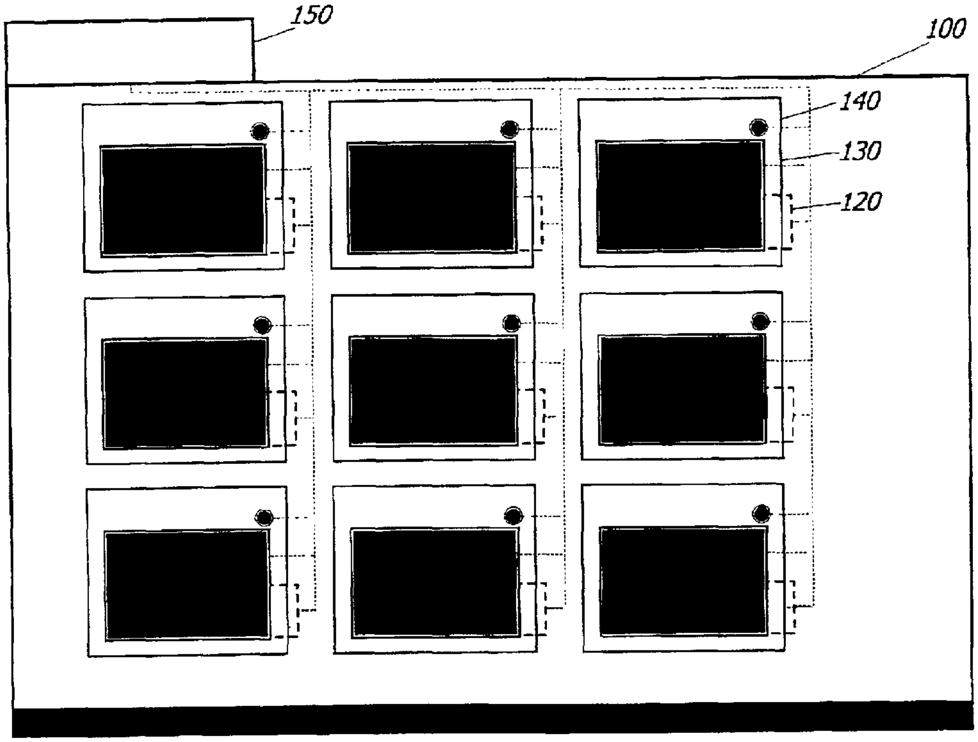
FIG. 22 is a diagram showing the locker according to the fourth embodiment of the present invention.

In the above first to third embodiments, the display unit 130 may be a small LCD which can display at least the OTP. In this embodiment, it is preferable that the display unit 130 is a monitor display having enough size suitable for displaying ad images as shown in FIG. 22. In this embodiment, such the display unit 130 are applied to a door of each locker box.

Process flows according to the fourth embodiment will now be described with reference to the drawings. In this embodiment, a case where a user uses the locker unit 100 in the similar manner of the first embodiment.

Figure 23:
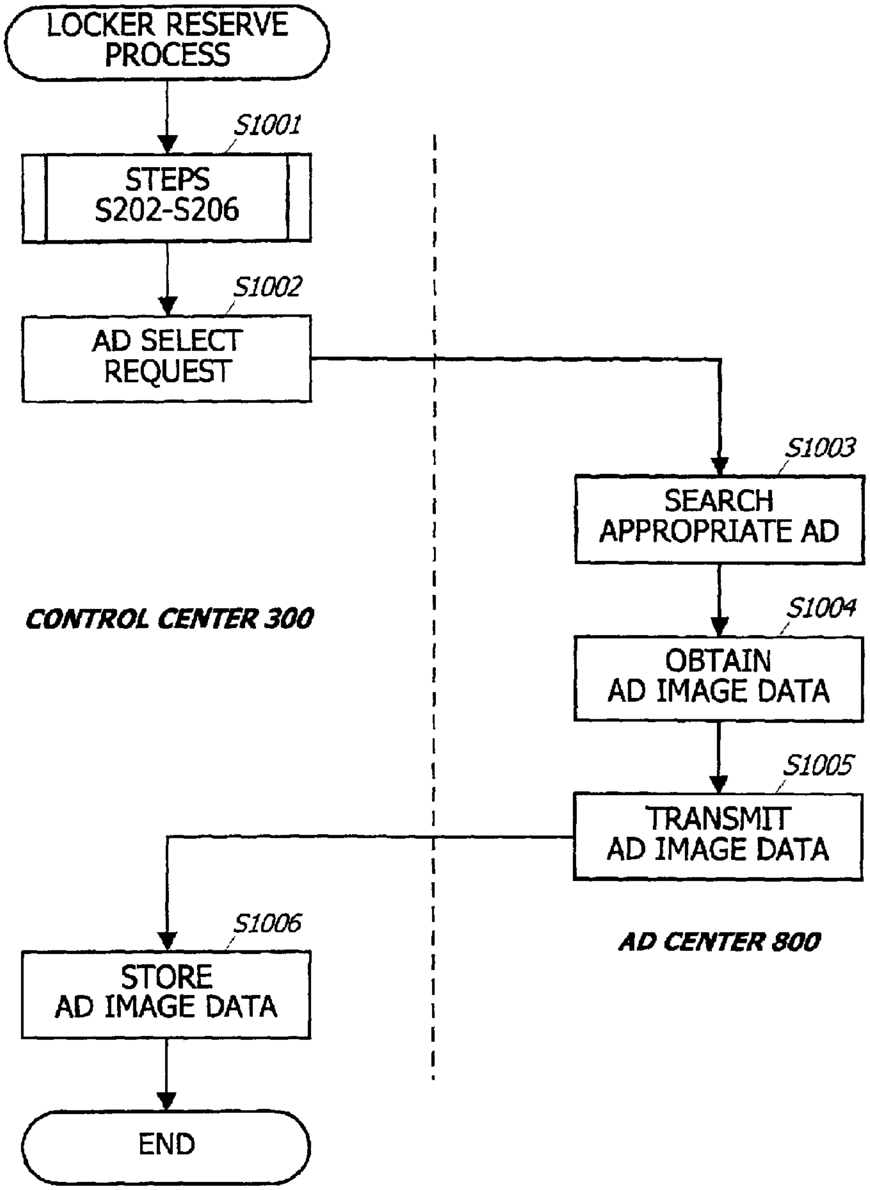
FIG. 23 is a flowchart for explaining the locker reserve process according to the fourth embodiment of the present invention.

That is, the user operates the user terminal 200 to carry out the locker search process according to the first embodiment (steps S101–S112: FIG. 7). Then, the locker reserve process is carried out in the same manner of the first embodiment (steps S201–S209: FIG. 11). In this embodiment, the control center has additional process tasks in the locker reserve process. Those additional process tasks will now be described in accordance with a flowchart shown in FIG. 23. In this embodiment, the control center 300 or the ad center 800 constantly provides ad image data to each locker controller 150 in accordance with the location of the locker unit 100 or the like (hereinafter, referred to as "ordinary ad information"), and such the ordinary ad information will be switched to personalized ad information during the user comes to the locker unit 100.

After the steps S202–S206 (see FIG. 11) have been done (step S1001), the control unit 310 of the control center 300 controls the CCU 320 to transmit an ad select request to the ad center 800 via the Internet 10 (step S1002). More precisely, the ad select request includes an instruction for personalization, attribution data of the user who reserved the locker box, location data of the locker unit 100 concerned, and the like.

Upon reception of the ad select request, the ad center 800 searches the ad image database for appropriate ad image data based on the user's attribution data and the location data (step S1003), and obtains the appropriate ad image data (step S1004).

The ad center 800 transmits the obtained ad image data to the control center 300 via the Internet 10.

The CCU 320 of the control center 300 receives the ad image data. The control unit 310 stores the received ad image in the locker information database 340 (step S1005).

More precisely, the control unit 310 stores the ad image data in the field "Additional Data" in the record corresponding to the reserved (specified) locker box.

Then, the user operates the user terminal 200 to carry out the locker unlock process. The locker unlock process according to the fourth embodiment will now be described.

When the user arrives at the locker unit 100, he/she operates the user terminal 200 to carry out the locker unlock process (steps S301–S308: FIG. 12). In this embodiment, in response to the user authentication (step S302), the control unit 310 of the control center 300 obtains the selected ad image data from the locker information database 340. And the control unit 310 controls the CCU 320 to transmit the obtained ad image data to the locker controller 150 corresponding to the specified locker box together with an instruction to switch the ad information.

The CCU 152 of the locker controller 150 receives the ad image data. The control unit 151 controls the command distributor 153 to control the display unit 130 corresponding to the specified locker box to display the received ad image data. Thus, the display unit 130 of the specified locker box displays the personalized ad image.

The other tasks of the locker unlock process (authentication of the OTP, unlocking, and the like) are the same as those of the first embodiment.

After the user drops the baggage in the locker box, he/she operates the user terminal 200 to carry out the locker re-lock process (steps S401–S408: FIG. 13). The locker re-lock process according to this embodiment is basically the same as that of the first embodiment, and has additional steps. That is, in response to updating the locker information database (step S408), the control center 300 generates an instruction to switch the personalized ad image being displayed back to the ordinal ad image. The control unit 310 of the control center 310 controls the CCU 320 to transmit the instruction to the locker controller 150 concerned, thus, the display unit 130 displays the ordinary ad image after the specified locker box is re-locked.

The control center 300 may send a request for charging the ad agency (ad center 800) for service fees using the locker system 3.

According to the locker system 3 of this embodiment, personalized ad image is displayed on the display unit 130 applied to the each locker box while the user of that locker box uses the locker box, thus, it improves the efficiency of the advertisement.

In this embodiment the control center 300 obtains personalized ad image data, transmits it to the locker controller 150 at the locker unlock process, however, the ad center 800 may transmits such the personalized ad image data directly to the locker controller 150. In this case, the locker controller 300 may instruct the timing of transmission to the ad center 800.

Instead of, or in addition to displaying the ad image on the display unit 130, the ad center 800 may collect attribute data of the users who made reservations beforehand, and the ad agency prepares personalized flyers and drops them in the reserved locker boxes.

In the above embodiment, the advertisement is done by displaying ad image. However, audio advertisement may be applicable to the present invention. In this case, each locker box may comprise a speaker unit.

In addition to the described structure, a terminal (such as a workstation and a personal computer) of an advertiser may be connected to the Internet 10, the advertiser may order advertisement business to the ad center 800 via the Internet 10. In this case, the ad image may be displayed on the display unit 130 in accordance with the above described process, and the billing server 500 may charge the advertiser for the advertisement using the locker system 3.

Applicable file format for the ad image data is arbitrary, for example, predetermined movie file format, picture image format, audio file format, web page format, and the like.

In the above described embodiment, the ad image data are provided via the Internet 10. However, the locker controllers 150 may be connected to the ad center 800 (or control center 300) directly via an analog signal cable, and analog signals representing the ad image may be supplied. In this case, the control center 300 may instruct the timing of ad image transmission to the ad image supplier.

In this embodiment, the ad center 800 is separated from the control center 300, however, the control center 300 may also act as the ad center 800.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application Nos. 2000-389329 (filed on Dec. 21, 2000), 2001-025865 (filed on Feb. 1, 2001), 2001-043529 (filed on Feb. 20, 2001) and 2001-065141 (filed on Mar. 8, 2001), and including their specifications, claims, drawings and summaries. The disclosures of the above Japanese Patent Applications are incorporated herein by reference in their entireties.

What is claimed is:

1. A locker system comprising lockers, a control center for remotely controlling said lockers, locker controllers applied to said lockers respectively, and user terminals operated by users of said lockers, wherein, each of said lockers include at least one compartment having an electronically controlled lock system and a display unit for displaying information given by said control center, said control center receives requests from said user terminals via a telecommunications network, and sends instructions based on the received requests to said locker controllers via said telecommunications network, and said locker controllers receive the instructions from said control center via said telecommunications network, and control corresponding lockers based on the received instructions.

2. The locker system according to claim 1, wherein said control center obtains status information of said lockers, specifies an available locker compartment based on the status information and the user's request, and provides information representing the available locker compartment to said user terminal which requested said control center to inform of an available locker compartment.

3. The locker system according to claim 1, wherein said locker controller controls said electronically controlled lock system of the compartment to lock or unlock the compartment indicated by the instruction from said control center.

4. The locker system according to claim 1, wherein said control center generates ID information in response to receiving the user's request, and transmits the generated ID information to said locker controller, said locker controller receives the ID information from said control center, and controls a corresponding display unit to display the received ID information, said user terminal transmits the ID information input by the user to said control center, and said control center receives the ID information from said user terminal, and transmits an instruction to allow the user to use the locker compartment to said locker controller, if the received ID information is correct.

5. The locker system according to claim 1, wherein said control center transmits an instruction to said locker controllers so as to keep unused locker compartments being locked.

6. The locker system according to claim 1, further comprising a delivery center and deliverer terminals connected to said telecommunication network, wherein said control center obtains information regarding a delivery from said delivery center, stores in a storage unit information sets, each regarding to the delivery, the locker compartments, and the users so that the information sets are associated to each other, specifies a locker compartment based on the information stored in said storage unit, transmits information representing the specified locker compartment to said deliverer terminal, and allows the deliverer to use the specified compartment by sending an instruction to unlock the compartment to said locker controller.

7. The locker system according to claim 1, further comprising an advertisement information provider being connected to said telecommunications network, which provides advertisement information to be displayed on said display unit with said locker controller, wherein said advertisement information provider obtains information regarding a user of said locker compartment, said advertisement information provider selects advertisement information based on the information regarding the user, and transmits the selected advertisement information to said locker controller when the user uses the locker compartment.

8. The locker system according to claim 1 further comprising a billing server connected to said telecommunications network, which bills for service fees regarding to said locker.

9. A locker controlling method for remotely controlling lockers via a telecommunications network, comprising:

obtaining information representing the status of the lockers via said telecommunications network;

receiving user's requests via said telecommunication network;

specifying an available locker compartment in said lockers which matches the user's request based on the obtained status information;

informing the user of the specified locker via said telecommunications network;

informing the specified locker of ID information via said telecommunications network together with an instruction to present the ID information to the user;

obtaining information to be presented at the lockers;

receiving the ID information from the user via said telecommunications network; and providing a locker with an instruction to unlock the specified locker compartment via said telecommunications network, if the received ID information is correct.

10. The method according to claim 9, wherein said instruction providing provides said locker with an instruction to keep the locker compartments locked during the time the locker compartments are unused.

11. The method according to claim 9, wherein the information is advertisement information, further comprising:

obtaining information regarding a user via said telecommunications network; selecting advertisement information based on the obtained information regarding the user; and providing said locker with the selected advertisement information via said telecommunications network together with an instruction to present the provided advertisement information when the user uses the locker compartment.

12. The method according to claim 9, further comprising:

obtaining information regarding a delivery from a deliverer via said telecommunications network;

specifying a locker compartment in said lockers based on the obtained delivery information;

informing the deliverer of the information representing the specified locker compartment via said telecommunications network; and informing the specified locker of ID information via said telecommunications network together with an instruction to present the ID information to the deliverer, wherein said ID information receiving receives the ID information from the deliverer via said telecommunications network, and said instruction providing provides a locker with an instruction to unlock the specified locker compartment via said telecommunications network, if the received ID information is correct.

13. The method according to claim 9, further comprising:

recognizing a plurality of users as a group; and allowing the plurality of the users of the group to share the specified locker compartment.

14. The method according to claim 9, further comprising:

obtaining information representing fees for the services of the lockers user by user; and billing the user for the service based on the obtained fee information.

15. A control center for remotely controlling lockers via a telecommunications network, comprising:

a connector which connects said control center to said telecommunications network;

a status manager which controls said connector to obtain status information of the lockers;

a request receiver which controls said connector to receive user's request from user's terminals being connected to said telecommunications network;

a locker finder which specifies an available locker compartment based on the status information, which matches the user's request received by said receiver;

an ID information generator which generates ID information in response to the specification by said locker finder;

an information presenter which controls said connector to present information representing the locker compartment specified by said locker finder to said user's terminal together with the ID information generated by said ID information generator;

an ID information transmitter which controls said connector to provide the specified locker compartment with the ID information together with an instruction to present the ID information to the user;

an ID information receiver which controls said connector to receive the ID information from the user's terminal;

an ID information authenticator which determines whether the ID information received by said ID information receiver coincides with the ID information generated by said ID information generator;

a locker controller which controls said connector to transmit an instruction to unlock the locker compartment if said ID information authenticator determines that the ID information sets coincide with each other; and an information manager which obtains information to be presented at the lockers.

16. The control center according to claim 15, further comprising:

a user information obtainer which obtains information regarding the user; and an advertisement selector which selects advertisement information from the information obtained by the information manager based on the user information obtained by said user information obtainer, wherein said locker controller controls said connector to transmit the advertisement information selected by said advertisement selector to the specified locker compartment together with an instruction to present the advertisement information to the user.

17. A computer readable recording medium storing a program which causes a computer to:

establish a connection with a telecommunications network;

obtain information representing status of lockers being connected to said telecommunications network;

receive a request of a user of the locker from a user terminal via said telecommunications network;

specify an available locker compartment based on the user's request and the status information;

transmit information representing the specified locker compartment to the user terminal via said telecommunications network;

generate ID information in response to the specification of the locker compartment;

transmit the generated ID information to the specified locker compartment via said telecommunications network together with an instruction to present the ID information to the user;

receive the ID information from the user terminal via said telecommunications network;

determine whether the received ID information coincides with the generated ID information; and transmit an instruction to the specified locker via said telecommunications network to unlock the specified locker compartment if it is determined that the received ID information coincides with the generated ID information; and obtain information to be presented at the lockers.

18. The computer readable recording medium according to claim 17, wherein the information is advertisement information, and wherein said program further causes said computer to:

obtain information regarding the user;

select advertisement information based on the obtained user information; and transmit the selected advertisement information to the specified locker via said telecommunications network together with an instruction to present the advertisement information to the user.

* * * * *